US011405956B2

(12) United States Patent
Zhang

(10) Patent No.: US 11,405,956 B2
(45) Date of Patent: Aug. 2, 2022

(54) METHOD AND DEVICE IN UE AND BASE STATION USED FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 151 days.

(21) Appl. No.: 17/012,082

(22) Filed: Sep. 4, 2020

(65) Prior Publication Data

US 2020/0404709 A1 Dec. 24, 2020

Related U.S. Application Data

(63) Continuation of application No. PCT/CN2019/078021, filed on Mar. 13, 2019.

(30) Foreign Application Priority Data

Mar. 26, 2018 (CN) .......................... 201810254689.9

(51) Int. Cl.
*H04W 74/08* (2009.01)
*H04W 28/26* (2009.01)
*H04W 72/04* (2009.01)

(52) U.S. Cl.
CPC ....... *H04W 74/0808* (2013.01); *H04W 28/26* (2013.01); *H04W 72/0446* (2013.01); *H04W 72/0453* (2013.01)

(58) Field of Classification Search
CPC ............. H04W 74/0808; H04W 28/26; H04W 72/0446; H04W 72/0453
See application file for complete search history.

(56) References Cited

U.S. PATENT DOCUMENTS 10,257,820 B2   4/2019  Wang et al.
10,873,423 B2 * 12/2020  Salem ................... H04L 1/1819
(Continued)

FOREIGN PATENT DOCUMENTS

CN   104507108 A    4/2015
CN   105165047 A   12/2015
(Continued)

OTHER PUBLICATIONS

1st Office Action in application No. CN201810254689.9 dated Apr. 2, 2020.
(Continued)

*Primary Examiner* — Brenda H Pham

(57) ABSTRACT

The disclosure provides a method and a device in a User Equipment (UE) and a base station for wireless communication. In one embodiment, the UE receives first information, the first information being used for determining that Q1 subband(s) is(are) reserved in a first time-domain resource, listens in a first time-domain sub-resource to determine Q2 subband(s) from Q3 subband(s), and transmits second information, the second information being used for indicating the Q2 subband(s) and any one of the Q3 subband(s) being orthogonal to any one of the Q1 subband(s) in frequency domain; wherein a first carrier comprises both the Q1 subband(s) and the Q3 subband(s); and the first time-domain sub-resource belongs to the first time-domain resource. The disclosure can improve efficiency of transmission and utilization of spectrum.

20 Claims, 15 Drawing Sheets

(56) References Cited

U.S. PATENT DOCUMENTS

| | | | |
|---|---|---|---|
| 11,160,042 B2* | 10/2021 | Liu | H04W 48/10 |
| 11,166,306 B2* | 11/2021 | Zhu | H04L 5/001 |
| 2015/0049715 A1* | 2/2015 | Yerramalli | H04L 27/0006 |
| | | | 370/329 |
| 2017/0171759 A1 | 6/2017 | Li et al. | |

FOREIGN PATENT DOCUMENTS

| | | |
|---|---|---|
| CN | 105306180 A | 2/2016 |
| CN | 105338568 A | 2/2016 |
| CN | 105636225 A | 6/2016 |
| CN | 106162900 A | 11/2016 |
| CN | 106231614 A | 12/2016 |
| CN | 106658742 Y | 5/2017 |
| CN | 107040342 Y | 8/2017 |
| WO | 2016167623 A1 | 10/2016 |

OTHER PUBLICATIONS

2nd Office Action in application No. CN201810254689.9 dated Jul. 7, 2020.

First search report in application No. CN201810254689.9 in dated Mar. 24, 2020.

ISR in application PCT/CN2019/078021 dated May 28, 2019.

* cited by examiner

METHOD AND DEVICE IN UE AND BASE STATION USED FOR WIRELESS COMMUNICATION

CROSS REFERENCE TO RELATED APPLICATIONS

This application is a continuation of International Application No. PCT/CN2019/078021, filed Mar. 13, 2019, claims the priority benefit of Chinese Patent Application No. 201810254689.9, filed on Mar. 26, 2018, the full disclosure of which is incorporated herein by reference.

BACKGROUND

Technical Field

The disclosure relates to transmission methods and devices in wireless communication systems, and in particular to a communication method and device supporting Listen Before Talk (LBT).

Related Art

Application scenarios of future wireless communication systems are becoming increasingly diversified, and different application scenarios have different performance requirements for systems. In order to meet different performance requirements of various application scenarios, the $3^{rd}$ Generation Partner Project (3GPP) Radio Access Network (RAN) #75 plenary session had approved a study item of access to unlicensed spectrum under New Radio (NR).

In Long Term Evolution (LTE) License Assisted Access (LAA), a transmitter (base station or UE) needs to perform LBT before transmitting data on unlicensed spectrum so as to avoid causing interferences to other wireless transmissions that are ongoing on unlicensed spectrum. In the Cat 4 LBT (Category 4 LBT, refer to 3GPP TR36.889) process, the transmitter will conduct backoff after a certain defer duration, the time of backoff is counted in unit of a Clear Channel Assessment (CCA) slot duration, and the number of slot durations of backoff is obtained by the transmitter's random selection in a Contention Window Size (CWS). For downlink transmission, the CWS is adjusted according to a Hybrid Automatic Repeat reQuest (HARQ) feedback corresponding to data in one previous reference subframe transmitted on the unlicensed spectrum. For uplink transmission, the CWS is adjusted according to whether data in one previous reference subframe on the unlicensed spectrum includes new data.

In existing NR systems, since system bandwidth probably becomes relatively wide, subband LBT is proposed, that is, a base station listens in partial bands within an LAA carrier bandwidth and transmits radio signals.

SUMMARY

The inventor finds through researches that, for subband LBT, a base station may find through LBT that only partial subbands among the multiple subbands included in one LAA carrier can be used for wireless transmission; if the base station transmits radio signals in the partial subbands immediately like in conventional LTE LAA, the base station cannot perform listening in the one LAA carrier before a Maximum Channel Occupation Time (MCOT) ends, thus being unable to utilize other subbands to transmit radio signals. The smaller the proportion of the partial subbands in the all subbands included in one LAA carrier, the lower the efficiency of transmission.

In LTE Device to Device (D2D), only uplink subframes or carriers can be allocated to a sidelink in order to avoid interferences from downlink signals. The inventor finds through researches that, in subband LBT, if a base station performs downlink transmission only occupying partial subbands in an LAA carrier, a UE can transmit or receive D2D signals occupying the subbands unoccupied by the base station; therefore, one problem to be solved is how does the UE know the subbands occupied by the base station.

In view of the discoveries, the disclosure provides a solution. It should be noted that embodiments of the disclosure and characteristics of the embodiments may be mutually combined arbitrarily, if not conflict is incurred. Further, although the initial purpose of the disclosure is for LAA communication, the method and device in the disclosure are also applicable to communication on licensed spectrum.

The disclosure provides a method in a UE for wireless communication, wherein the method includes:

receiving first information, the first information being used for determining that Q1 subband(s) is(are) reserved in a first time-domain resource;

listening in a first time-domain sub-resource to determine Q2 subband(s) from Q3 subband(s); and transmitting second information, the second information being used for indicating the Q2 subband(s), and any one of the Q3 subband(s) being orthogonal to any one of the Q1 subband(s) in frequency domain.

Herein, a first carrier includes both the Q1 subband(s) and the Q3 subband(s); the Q1, the Q2 and the Q3 are positive integers respectively; the first time-domain sub-resource belongs to the first time-domain resource; and the Q3 is not less than the Q2.

In one embodiment, the Q2 subband(s) is(are) a subset of the Q3 subband(s).

In one embodiment, the second information is transmitted on an uplink channel.

In the above embodiment, the second information transmitted by the UE can help a base station determine whether subbands in the first carrier other than the Q1 subband(s) are idle; if the base station determines through the second information that lots of subbands in the first carrier other than the Q1 subband(s) are idle, the base station can terminate the transmission in the Q1 subband(s) in advance (without waiting the end of MCOT), and initiates LBT in the first carrier so as to occupy more subbands as early as possible to perform transmission.

In one embodiment, the second information is transmitted in a sidelink.

In the above embodiment, the second information transmitted by the UE can help other terminals determine in the first carrier possible subbands to perform transmission (avoiding occupying the Q1 subband(s)), thereby avoiding causing downlink interference to the communication on the sidelink.

Specifically, according to one aspect of the disclosure, the second information is used by a receiver of the second information to determine a second time-domain sub-resource to perform listening in the first carrier.

In one embodiment, the second information is used by the receiver of the second information to determine a second time-domain sub-resource to perform listening in the first carrier, and the receiver of the second information is a transmitter of the first information.

Specifically, according to one aspect of the disclosure, the second information is used by a receiver of the second information to determine in the first carrier a possible subband to perform transmission.

In one embodiment, a duration of the second time-domain sub-resource is less than a duration of one multicarrier symbol.

In one embodiment, a duration of the second time-domain sub-resource is not greater than 25 microseconds.

In one embodiment, the second information is used by the receiver of the second information to determine in the first carrier a possible subband to perform transmission, and the receiver of the second information is one terminal.

In one embodiment, in the first carrier the possible subband to perform transmission includes the Q2 subband(s).

In one embodiment, in the first carrier the possible subband to perform transmission does not include the Q1 subband(s).

In one embodiment, in the first carrier the possible subband to perform transmission does not include subbands among the Q3 subband(s) other than the Q2 subband(s).

In one embodiment, the receiver of the second information listens in the possible subband to perform transmission in the first carrier so as to determine partial or all of the subbands to perform wireless transmission.

Specifically, according to one aspect of the disclosure, the method includes:

receiving third information, the third information being used for indicating Q4 subband(s).

Herein, the Q3 subband(s) is(are) composed of all subbands among the Q4 subbands that do not belong to the Q1 subband(s), and the Q4 is a positive integer.

Specifically, according to one aspect of the disclosure, the method includes:

receiving fourth information, the fourth information being used for determining a first threshold.

Herein, the Q2 subband(s) is(are) composed of all subbands among the Q3 subbands on which a detected energy is lower than the first threshold.

Specifically, according to one aspect of the disclosure, the method includes:

receiving a first radio signal in Q5 subband(s) in the first carrier.

Herein, the second information is used by a transmitter of the first radio signal to determine the Q5 subband(s); the transmitter of the first radio signal is one terminal, or the transmitter of the first radio signal is a transmitter of the first information; and the Q5 is a positive integer.

Specifically, according to one aspect of the disclosure, the Q3 is greater than 1; the Q3 subbands are listened in Q3 slots respectively so as to determine the Q2 subband(s); the Q3 slots all belong to the first time-domain sub-resource; and at least two of the Q3 slots are not completely overlapping.

The disclosure provides a method in a UE for wireless communication, wherein the method includes:

receiving second information, the second information being used for indicating Q2 subband(s), and the Q2 subband(s) all belonging to a first carrier; and transmitting a first radio signal in Q5 subband(s) in the first carrier.

Herein, the second information is used for determining the Q5 subband(s); a transmitter of the second information is one terminal; the Q2 and the Q5 are positive integers respectively.

Specifically, according to one aspect of the disclosure, the second information is used for determining an end time of a first time-domain resource; Q1 subband(s) in the first time-domain resource is(are) indicated, by first information, to be reserved, and the first information is used by a transmitter of the second information to determine the Q2 subband(s) from Q3 subband(s); any one of the Q3 subband(s) is orthogonal to any one of the Q1 subband(s) in frequency domain; the first carrier includes both the Q1 subband(s) and the Q3 subband(s); the Q1 and the Q3 are positive integers respectively; and the Q3 is not less than the Q2.

In one embodiment, the transmitter of the second information is one terminal.

In one embodiment, the first radio signal is transmitted in the first time-domain resource.

In one embodiment, the UE receives the first radio signal in the first time-domain resource.

Specifically, according to one aspect of the disclosure, the method includes:

listening in the Q2 subband(s) to determine the Q5 subband(s).

Herein, on each of the Q5 subband(s) a detected energy is not greater than a second threshold.

The disclosure provides a method in a base station for wireless communication, wherein the method includes:

transmitting first information, the first information being used for determining that Q1 subband(s) is(are) reserved in a first time-domain resource; and receiving second information, the second information being used for indicating Q2 subband(s).

Herein, the first information is used for determining the Q2 subband(s) from Q3 subband(s), any one of the Q3 subband(s) is orthogonal to any one of the Q1 subband(s) in frequency domain; the first carrier includes both the Q1 subband(s) and the Q3 subband(s); the Q1, the Q2 and the Q3 are positive integers respectively; a first time-domain sub-resource belongs to the first time-domain resource; and the Q3 is not less than the Q2.

Specifically, according to one aspect of the disclosure, the method includes:

listening in a second time-domain sub-resource in the first carrier to determine Q5 subband(s); and transmitting a first radio signal in the Q5 subband(s).

Herein, the second information is used for determining the second time-domain sub-resource.

Specifically, according to one aspect of the disclosure, the method includes:

transmitting third information, the third information being used for indicating Q4 subband(s).

Herein, the Q3 subband(s) is(are) composed of all subbands among the Q4 subbands that do not belong to the Q1 subband(s), and the Q4 is a positive integer.

Specifically, according to one aspect of the disclosure, the method includes:

transmitting fourth information, the fourth information being used for determining a first threshold.

Herein, the Q2 subband(s) is(are) composed of all subbands among the Q3 subbands on which a detected energy is lower than the first threshold.

Specifically, according to one aspect of the disclosure, the Q3 is greater than 1; the Q3 subbands are listened in Q3 slots respectively so as to determine the Q2 subband(s); the Q3 slots all belong to the first time-domain sub-resource; and at least two of the Q3 slots are not completely overlapping.

The disclosure provides a UE for wireless communication, wherein the UE includes:

a first receiver, to receive first information, the first information being used for determining that Q1 subband(s) is(are) reserved in a first time-domain resource;

a first listener, to listen in a first time-domain sub-resource to determine Q2 subband(s) from Q3 subband(s); and a first transmitter, to transmit second information, the second information being used for indicating the Q2 subband(s), and any one of the Q3 subband(s) being orthogonal to any one of the Q1 subband(s) in frequency domain.

Herein, a first carrier includes both the Q1 subband(s) and the Q3 subband(s); the Q1, the Q2 and the Q3 are positive integers respectively; the first time-domain sub-resource belongs to the first time-domain resource; and the Q3 is not less than the Q2.

In one embodiment, the above UE includes:

a second receiver, to receive third information, the third information being used for indicating Q4 subband(s).

Herein, the Q3 subband(s) is(are) composed of all subbands among the Q4 subbands that do not belong to the Q1 subband(s), and the Q4 is a positive integer.

In one embodiment, the above UE is characterized in that: the second information is used by a receiver of the second information to determine a second time-domain sub-resource to perform listening in the first carrier; or, the second information is used by a receiver of the second information to determine in the first carrier a possible subband to perform transmission.

In one embodiment, the above UE includes:

a second receiver, to receive fourth information, the fourth information being used for determining a first threshold.

Herein, the Q2 subband(s) is(are) composed of all subbands among the Q3 subbands on which a detected energy is lower than the first threshold.

In one embodiment, the above UE includes:

a second receiver, to receive a first radio signal in Q5 subband(s) in the first carrier.

Herein, the second information is used by a transmitter of the first radio signal to determine the Q5 subband(s); the transmitter of the first radio signal is one terminal, or the transmitter of the first radio signal is a transmitter of the first information; and the Q5 is a positive integer.

In one embodiment, the above UE includes: the Q3 is greater than 1; the Q3 subbands are listened in Q3 slots respectively so as to determine the Q2 subband(s); the Q3 slots all belong to the first time-domain sub-resource; and at least two of the Q3 slots are not completely overlapping.

The disclosure provides a UE for wireless communication, wherein the UE includes:

a third receiver, to receive second information, the second information being used for indicating Q2 subband(s), and the Q2 subband(s) all belonging to a first carrier; and a third transmitter, to transmit a first radio signal in Q5 subband(s) in the first carrier.

Herein, the second information is used for determining the Q5 subband(s); a transmitter of the second information is one terminal; the Q2 and the Q5 are positive integers respectively.

In one embodiment, the above UE is characterized in that: the second information is used for determining an end time of a first time-domain resource; Q1 subband(s) in the first time-domain resource is(are) indicated, by first information, to be reserved, and the first information is used by a transmitter of the second information to determine the Q2 subband(s) from Q3 subband(s); any one of the Q3 subband(s) is orthogonal to any one of the Q1 subband(s) in frequency domain; the first carrier includes both the Q1 subband(s) and the Q3 subband(s); the Q1 and the Q3 are positive integers respectively; and the Q3 is not less than the Q2.

In one embodiment, the above UE includes:

a second listener, to listen in the Q2 subband(s) to determine the Q5 subband(s).

Herein, on each of the Q5 subband(s) a detected energy is not greater than a second threshold.

The disclosure provides a base station for wireless communication, wherein the base station includes:

a second transmitter, to transmit first information, the first information being used for determining that Q1 subband(s) is(are) reserved in a first time-domain resource; and a fourth receiver, to receive second information, the second information being used for indicating Q2 subband(s).

Herein, the first information is used for determining the Q2 subband(s) from Q3 subband(s), any one of the Q3 subband(s) is orthogonal to any one of the Q1 subband(s) in frequency domain; the first carrier includes both the Q1 subband(s) and the Q3 subband(s); the Q1, the Q2 and the Q3 are positive integers respectively; a first time-domain sub-resource belongs to the first time-domain resource; and the Q3 is not less than the Q2.

In one embodiment, the above base station includes:

a third listener, to listen in a second time-domain sub-resource in the first carrier to determine Q5 subband(s); and a fourth transmitter, to transmit a first radio signal in the Q5 subband(s).

Herein, the second information is used for determining the second time-domain sub-resource.

In one embodiment, the above base station includes:

a fourth transmitter, to transmit third information, the third information being used for indicating Q4 subband(s), wherein the Q3 subband(s) is(are) composed of all subbands among the Q4 subbands that do not belong to the Q1 subband(s), and the Q4 is a positive integer.

In one embodiment, the above base station includes:

a fourth transmitter, to transmit fourth information, the fourth information being used for determining a first threshold, wherein the Q2 subband(s) is(are) composed of all subbands among the Q3 subbands on which a detected energy is lower than the first threshold.

In one embodiment, the above base station is characterized in that: the Q3 is greater than 1; the Q3 subbands are listened in Q3 slots respectively so as to determine the Q2 subband(s); the Q3 slots all belong to the first time-domain sub-resource; and at least two of the Q3 slots are not completely overlapping.

In one embodiment, compared with conventional schemes, the disclosure has the following benefits.

Once one subband is found idle, the base station can occupy it quickly and perform wireless transmission, thereby acquiring as many transmitting opportunities as possible; meanwhile, the base station can occupy more subbands for downlink transmission in time according to UE feedback, thereby improving efficiency of transmission.

D2D UEs are allowed to perform communication using the subbands unoccupied by the base station, thereby improving efficiency of transmission.

BRIEF DESCRIPTION OF TH E DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
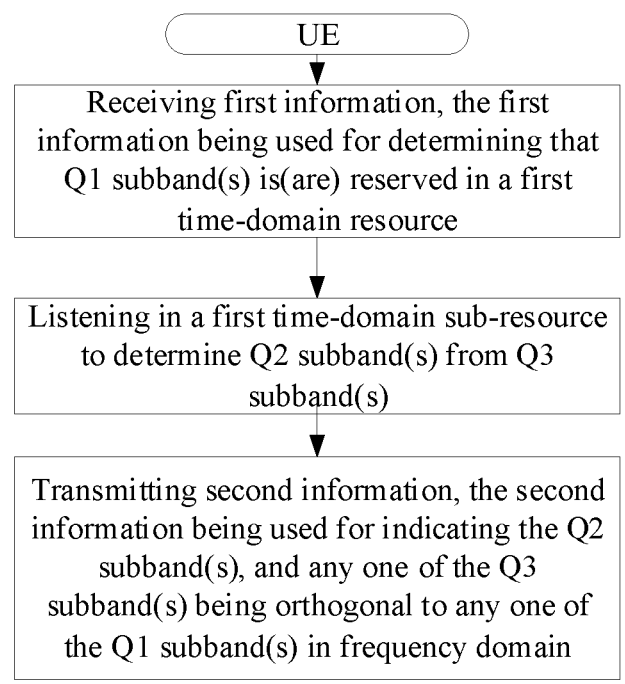
FIG. 1 is a flowchart of processing at a UE side according to one embodiment of the disclosure.

Embodiment 1 illustrates a flowchart of processing at a UE side, as shown in FIG. 1.

In Embodiment 1, the UE first receives first information, the first information being used for determining that Q1 subband(s) is(are) reserved in a first time-domain resource, and then listens in a first time-domain sub-resource to determine Q2 subband(s) from Q3 subband(s), and finally transmits second information, the second information being used for indicating the Q2 subband(s) and any one of the Q3 subband(s) being orthogonal to any one of the Q1 subband(s) in frequency domain.

In Embodiment 1, a first carrier includes both the Q1 subband(s) and the Q3 subband(s); the Q1, the Q2 and the Q3 are positive integers respectively; the first time-domain sub-resource belongs to the first time-domain resource; and the Q3 is not less than the Q2.

In one embodiment, the first information is carried by one physical layer signaling.

In one embodiment, the first information is carried by one piece of Downlink Control Information (DCI).

In one embodiment, the first information is transmitted on a Physical Downlink Control Channel (PDCCH).

In one embodiment, the first information is broadcast.

In one embodiment, the first information is cell specific.

In one embodiment, the first information is one field in one DCI.

In one embodiment, the first information is a Medium Access Control (MAC) signaling.

In one embodiment, the second information is a physical layer signaling.

In one embodiment, the second information is transmitted on a Physical Uplink Control Channel (PUCCH).

In one embodiment, the second information is transmitted on a Physical Uplink Shared Channel (PUSCH).

In one embodiment, the second information is transmitted on a sidelink.

In one embodiment, the second information is transmitted on a Physical Sidelink Control Channel (PSCCH).

In one embodiment, the second information is transmitted on a Physical Sidelink Shared Channel (PSSCH).

In one embodiment, the second information is transmitted on a Physical Sidelink Broadcast Channel (PSBCH).

In one embodiment, both the first information and the second information are dynamically indicated.

In one embodiment, the first time-domain resource includes a positive integer number of multicarrier symbols in time domain.

In one embodiment, the first time-domain resource includes a positive integer number of consecutive multicarrier symbols in time domain.

In one embodiment, the first time-domain sub-resource includes a positive integer number of consecutive multicarrier symbols in time domain.

In one embodiment, a duration of the first time-domain sub-resource in time domain is less than a duration of one multicarrier symbol.

In one embodiment, a duration of the first time-domain sub-resource is not greater than 25 microseconds.

In one embodiment, the first time-frequency resource includes multiple Resource Elements (REs), the RE occupies one multicarrier symbol in time domain and occupies one subcarrier in frequency domain.

In one embodiment, the multicarrier symbol is an Orthogonal Frequency Division Multiplexing (OFDM) symbol.

In one embodiment, the multicarrier symbol is a Single Carrier Frequency Division Multiplexing Access (SC-FDMA) symbol.

In one embodiment, the multicarrier symbol is a Filter Bank Multi-Carrier (FBMC) symbol.

In one embodiment, the first carrier is composed of the Q1 subband(s) and the Q3 subband(s).

In one embodiment, the first carrier includes at least one subband which is orthogonal to any one of the Q1 subband(s) and orthogonal to any one of the Q3 subband(s).

In one embodiment, all subbands among the Q1 subband(s) and the Q3 subband(s) have a same bandwidth.

In one embodiment, frequency domain resources occupied by any one of the Q1 subband(s) and the Q3 subband(s) are continuous in frequency domain.

In one embodiment, the UE assumes based on the first information that: the Q1 subband(s) is(are) occupied by a transmitter of the first information in the first time-domain resource.

In one embodiment, the UE assumes based on the first information that: a transmitter of the first information stops transmitting in the Q1 subband(s) at the end of the first time-domain resource, unless the transmitter of the first information performs LBT in the first carrier in the first time-domain resource.

In one embodiment, the first information indicates that the first time-domain resource is a current MCOT, that is, a maximum time the first carrier can currently be occupied one time by a transmitter of the first information. The MCOT generally is restricted to regulations.

In one embodiment, a transmitter of the first information is one serving cell.

In one embodiment, a transmitter of the first information is one serving cell.

In one embodiment, a transmitter of the first information is one base station.

In one embodiment, the second information is used for indicating an end time of the first time-domain resource.

In one embodiment, the second information is used for indicating a start time and a duration of the first time-domain resource.

In one embodiment, the first carrier includes Q subbands; the Q1 subband(s) and the Q2 subband(s) are subsets of the Q subbands respectively.

In one embodiment, the first information indicates the Q1 subband(s).

In one embodiment, the first information indicates implicitly the Q1 subband(s).

In one embodiment, the first carrier is deployed on unlicensed spectrum.

In one embodiment, the first information is transmitted in the first carrier.

In one embodiment, the first information is transmitted in a second carrier, and the second carrier is orthogonal to the first carrier in frequency domain (that is, non-overlapping).

In one embodiment, the second information is transmitted in a second carrier, and the second carrier is orthogonal to the first carrier in frequency domain (that is, non-overlapping).

In one embodiment, the first information is transmitted on a PUCCH.

In one embodiment, the first information is an uplink signaling.

In one embodiment, the action of listening includes an energy detection.

In one embodiment, the action of listening includes a sequence decorrelation.

In one embodiment, the action of listening includes a Cyclic Redundancy Check (CRC) detection.

In one embodiment, the second information indicates the Q2 subband(s) from the Q3 subband(s).

In one embodiment, the first carrier includes Q subbands, the Q1 subband(s) and the Q3 subband(s) are subsets of the Q subbands respectively, and the second information indicates the Q2 subband(s) from the Q subband(s).

In one embodiment, in the action of listening, a detected energy on each of the Q2 subband(s) does not exceed a first threshold.

In one embodiment, the Q2 subband(s) include(s) all subband(s) among the Q3 subbands on which a detected energy is lower than the first threshold.

In one embodiment, the first threshold is configurable.

In one embodiment, the first threshold is fixed (that is, non-configurable).

In one embodiment, the first threshold is predefined.

In one embodiment, the first threshold is in unit of dBm.

In one embodiment, the first threshold is in unit of mW.

In one embodiment, the Q subbands all have a same bandwidth.

In one embodiment, at least two of the Q subbands have different bandwidths.

In one embodiment, the Q subbands are Q BandWidth Parts (BWPs) respectively.

In one embodiment, each of the Q subbands includes a positive integer number of consecutive Resource Blocks (RBs) in frequency domain, and the RB is composed of 12 consecutive subcarriers in frequency domain.

Embodiment 2

Figure 2:
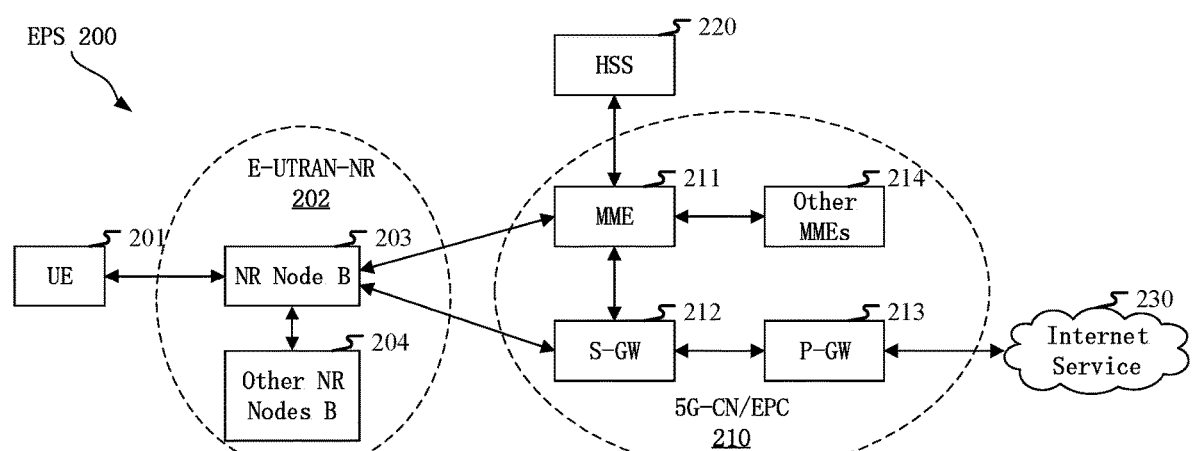
FIG. 2 is a diagram illustrating a network architecture according to one embodiment of the disclosure.

Embodiment 2 illustrates a diagram of a network architecture, as shown in FIG. 2.

FIG. 2 illustrates a network architecture 200 of Long-Term Evolution (LTE), Long-Term Evolution Advanced (LTE-A) and future 5G systems. The LTE system network architecture 200 may be called an Evolved Packet System (EPS) 200. The EPS 200 may include one or more UEs 201, an Evolved UMTS Terrestrial Radio Access Network-New Radio (E-UTRAN-NR) 202, a 5G-Core Network/Evolved Packet Core (5G-CN/EPC) 210, a Home Subscriber Server (HSS) 220 and an Internet Service 230. Herein, the UMTS represents Universal Mobile Telecommunication System. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services. The E-UTRAN-NR includes an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Basic Service Set (BSS), an Extended Service Set (ESS), a Transmitter Receiver Point (TRP) or other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the 5G-CN/EPC 210 via an S1 interface. The 5G-CN/EPC 210 includes an MME 211, other MMEs 214, a Service Gateway (S-GW) 212 and a Packet Data Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet Switching Streaming Services (PSSs).

In one embodiment, the UE 201 corresponds to the UE in the disclosure.

In one embodiment, the gNB 203 corresponds to the base station in the disclosure.

In one subembodiment, the UE 201 supports wireless communication of data transmission on unlicensed spectrums.

In one subembodiment, the gNB 203 supports wireless communication of data transmission on unlicensed spectrums.

In one subembodiment, the UE 201 supports D2D communication.

In one subembodiment, the gNB 203 supports D2D communication.

Embodiment 3

Figure 3:
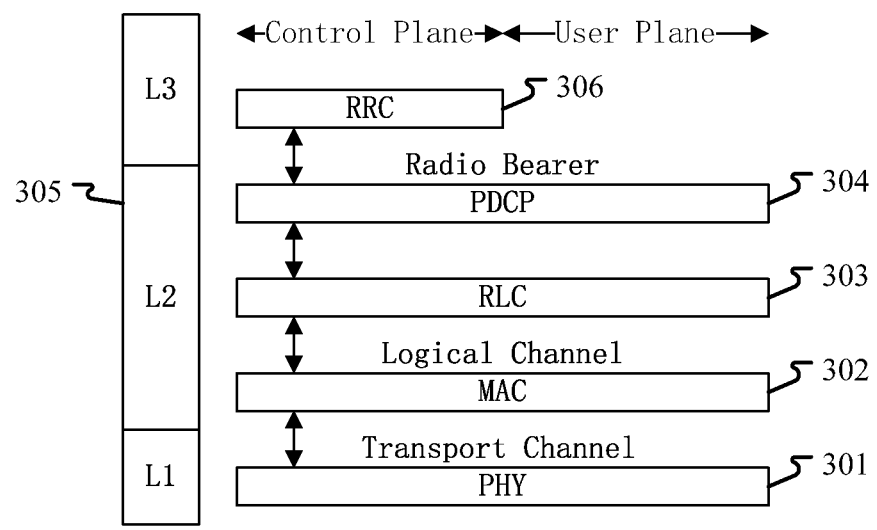
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a gNB is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 3, the UE may include several higher layers above the L2 layer 305, including a network layer (i.e. IP layer) terminated at the P-GW 213 on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture shown in FIG. 3 is applicable to the UE in the disclosure.

In one embodiment, the radio protocol architecture shown in FIG. 3 is applicable to the base station in the disclosure.

In one embodiment, the first information in the disclosure is generated on the PHY 301.

In one embodiment, the second information in the disclosure is generated on the PHY 301.

In one embodiment, the physical layer signaling in the disclosure is generated on the PHY 301.

In one embodiment, the third information in the disclosure is generated on the MAC sublayer 302.

In one embodiment, the fourth information in the disclosure is generated on the MAC sublayer 302.

In one embodiment, the third information in the disclosure is generated on the RRC sublayer 306.

In one embodiment, the fourth information in the disclosure is generated on the RRC sublayer 306.

In one embodiment, the physical layer signaling group in the disclosure is generated on the PHY 301.

In one embodiment, the RRC signaling in the disclosure is generated on the RRC sublayer 306.

Embodiment 4

Figure 4:
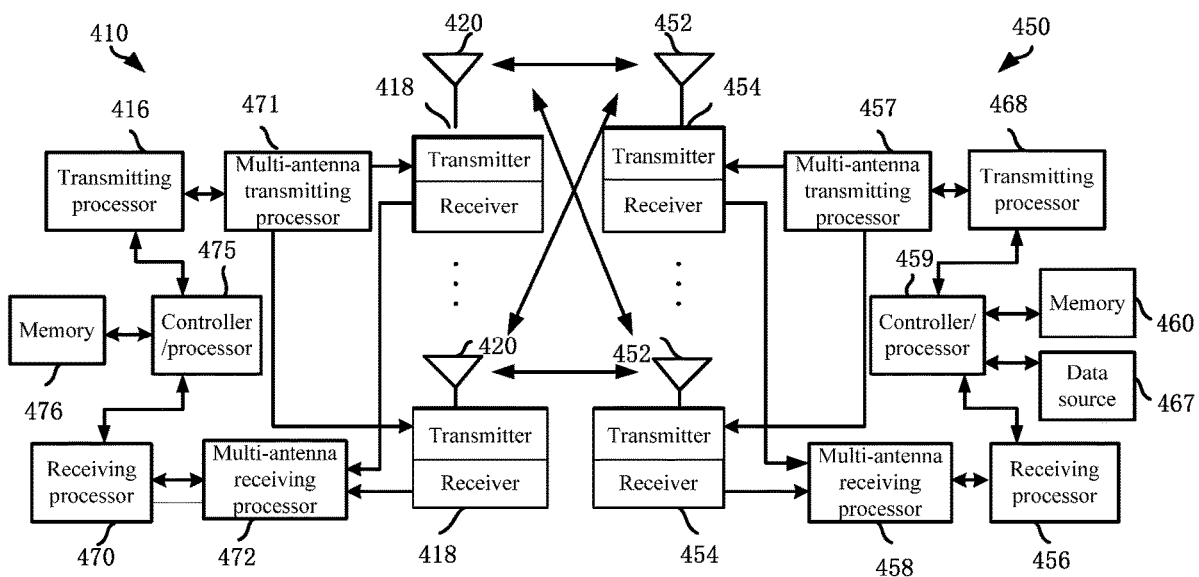
FIG. 4 is a diagram illustrating an NR node and a UE according to one embodiment of the disclosure.

Embodiment 4 illustrates a diagram of an NR node and a UE, as shown in FIG. 4. FIG. 4 is a block diagram of a UE 450 and a gNB 410 that communicate with each other in an access network.

The gNB 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In Downlink (DL) transmission, at the gNB 410, a higher-layer packet from a core network is provided to the controller/processor 475. The controller/processor 475 provides functions of Layer 2. In downlink transmission, the controller/processor 475 provides header compression, encryption, packet segmentation and reordering, multiplexing between a logical channel and a transport channel, and a radio resource allocation for the UE 450 based on various priority metrics. The controller/processor 475 is also in charge of HARQ operation, retransmission of lost packets, and signalings to the UE 450. The transmitting processor 416 and the multi-antenna transmitting processor 471 perform various signal processing functions used for L1 layer (that is, PHY). The transmitting processor 416 performs encoding and interleaving so as to ensure FEC (Forward Error Correction) at the UE 450 side and mappings to signal clusters corresponding to different modulation schemes (i.e., BPSK, QPSK, M-PSK M-QAM, etc.). The multi-antenna transmitting processor 471 processes the encoded and modulated symbols by digital spatial precoding/beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams by a transmitting analog precoding/beamforming operation. Each transmitter 418 converts a baseband multicarrier symbol stream provided by the multi-antenna transmitting processor 471 into a radio frequency stream and then provides it to different antennas 420.

In DL transmission, at the UE 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of L1 layer. The multi-antenna receiving processor 458 processes the baseband multicarrier symbol stream coming from the receiver 454 by a receiving analog precoding/beamforming operation. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the gNB 410. Next, the higher-layer data and control signal are provided to the controller/processor 459. The controller/processor 459 performs functions of L2 layer. The controller/processor 459 may be connected to the memory 460 that stores program codes and data. The memory 460 may be called a computer readable media. In DL transmission, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above L2 layer, or various control signals can be provided to L3 layer for processing. The controller/processor 459 can also perform error detection using ACK and/or NACK protocols to support the HARQ operation.

In Uplink (UL) transmission, at the UE 450, the data source 467 provides a higher-layer packet to the controller/processor 459. The data source 467 illustrates all protocol layers above the L2 layer. Similar as the transmitting function of the gNB 410 described in DL transmission, the controller/processor 459 provides header compression, encryption, packet segmentation and reordering, and multiplexing between a logical channel and a transport channel based on the radio resource allocation of the base station 410 so as to provide the functions of L2 layer used for the control plane and user plane. The controller/processor 459 is also in charge of HARQ operation, retransmission of lost packets, and signalings to the gNB 410. The transmitting processor 468 conducts modulation mapping and channel encoding processing; the multi-antenna transmitting processor 457 performs digital multi-antenna spatial precoding/beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In UL transmission, the function of the gNB 410 is similar as the receiving function of the UE 450 described in the DL transmission. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of L1 layer. The controller/processor 475 provides functions of L2 layer. The controller/processor 475 may be connected to the memory 476 that stores program codes and data. The memory 476 may be called a computer readable media. In UL transmission, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network. The controller/processor 475 can also perform error detection using ACK and/or NACK protocols to support the HARQ operation.

In one embodiment, the UE 450 includes at least one processor and at least one memory. The at least one memory includes computer program codes. The at least one memory and the computer program codes are configured to be used in collaboration with the at least one processor. The UE 450 at least receives first information, the first information being used for determining that Q1 subband(s) is(are) reserved in a first time-domain resource, listens in a first time-domain sub-resource to determine Q2 subband(s) from Q3 subband(s), and transmits second information, the second information being used for indicating the Q2 subband(s) and any one of the Q3 subband(s) being orthogonal to any one of the Q1 subband(s) in frequency domain; wherein a first carrier includes both the Q1 subband(s) and the Q3 subband(s); the Q1, the Q2 and the Q3 are positive integers respectively; the first time-domain sub-resource belongs to the first time-domain resource; and the Q3 is not less than the Q2.

In one embodiment, the UE 450 includes a memory that stores a computer readable instruction program. The computer readable instruction program generates an action when executed by at least one processor. The action includes: receiving first information, the first information being used for determining that Q1 subband(s) is(are) reserved in a first time-domain resource, listening in a first time-domain sub-resource to determine Q2 subband(s) from Q3 subband(s), and transmitting second information, the second information being used for indicating the Q2 subband(s) and any one of the Q3 subband(s) being orthogonal to any one of the Q1 subband(s) in frequency domain; wherein a first carrier includes both the Q1 subband(s) and the Q3 subband(s); the Q1, the Q2 and the Q3 are positive integers respectively; the first time-domain sub-resource belongs to the first time-domain resource; and the Q3 is not less than the Q2.

In one embodiment, the gNB 410 includes at least one processor and at least one memory. The at least one memory includes computer program codes. The at least one memory and the computer program codes are configured to be used in collaboration with the at least one processor. The gNB 410 at least: transmits first information, the first information being used for determining that Q1 subband(s) is(are) reserved in a first time-domain resource, and receives second information, the second information being used for indicating Q2 subband(s); wherein the first information is used for determining the Q2 subband(s) from Q3 subband(s), any one of the Q3 subband(s) is orthogonal to any one of the Q1 subband(s) in frequency domain; the first carrier includes both the Q1 subband(s) and the Q3 subband(s); the Q1, the Q2 and the Q3 are positive integers respectively; a first time-domain sub-resource belongs to the first time-domain resource; and the Q3 is not less than the Q2.

In one embodiment, the gNB 410 includes a memory that stores a computer readable instruction program. The computer readable instruction program generates an action when executed by at least one processor. The action includes: transmitting first information, the first information being used for determining that Q1 subband(s) is(are) reserved in a first time-domain resource, and receiving second information, the second information being used for indicating Q2 subband(s); wherein the first information is used for determining the Q2 subband(s) from Q3 subband(s), any one of the Q3 subband(s) is orthogonal to any one of the Q1 subband(s) in frequency domain; the first carrier includes both the Q1 subband(s) and the Q3 subband(s); the Q1, the Q2 and the Q3 are positive integers respectively; a first time-domain sub-resource belongs to the first time-domain resource; and the Q3 is not less than the Q2.

In one embodiment, the UE 450 corresponds to the UE in the disclosure.

In one embodiment, the gNB 410 corresponds to the base station in the disclosure.

In one embodiment, the antenna 452, the receiver 454 or the receiving processor 456 are used for receiving the first information in the disclosure; and at least one of the antenna 420, the transmitter 418 or the transmitting processor 416 is used for transmitting the first information in the disclosure.

In one embodiment, at least one of the multiantenna receiving processor 458 or the controller/processor 459 is used for receiving the first information in the disclosure; and at least one of the multiantenna transmitting processor 471 or the controller/processor 475 is used for transmitting the first information in the disclosure.

In one embodiment, the antenna 420, the receiver 418 or the receiving processor 470 are used for receiving the second information in the disclosure; and the antenna 452, the transmitter 454 or the transmitting processor 468 are used for transmitting the second information in the disclosure.

In one embodiment, at least one of the multiantenna receiving processor 472 or the controller/processor 475 is used for receiving the second information in the disclosure; and at least one of the multiantenna transmitting processor 457 or the controller/processor 459 is used for transmitting the second information in the disclosure.

In one embodiment, the antenna 420, the receiver 418, the transmitting processor 471 or the controller/processor 475 are used for transmitting the first radio signal in the disclosure; and the antenna 452, the transmitter 454, the receiving processor 456 or the controller/processor 459 are used for receiving the first radio signal in the disclosure.

In one embodiment, the multiantenna receiving processor 472 is used for transmitting the first radio signal in the disclosure; and the multiantenna transmitting processor 457 is used for receiving the first radio signal in the disclosure.

In one embodiment, at least one of the antenna 420, the receiver 418, the receiving processor 470, the multiantenna transmitting processor 471 or the controller/processor 475 is used for transmitting the third information in the disclosure; and at least one of the antenna 452, the transmitter 454, the receiving processor 456, the multiantenna transmitting processor 457 or the controller/processor 459 is used for receiving the third information in the disclosure.

In one embodiment, at least one of the antenna 420, the receiver 418, the receiving processor 470, the multiantenna transmitting processor 471 or the controller/processor 475 is used for transmitting the fourth information in the disclosure; and at least one of the antenna 452, the transmitter 454, the receiving processor 456, the multiantenna transmitting processor 457 or the controller/processor 459 is used for receiving the fourth information in the disclosure.

In one embodiment, at least one of the antenna 452, the receiver 454, the receiving processor 456, the multiantenna receiving processor 458 or the controller/processor 459 is used for the action of measurement performed at the UE side in the disclosure.

In one embodiment, at least one of the antenna 420, the receiver 418, the receiving processor 470, the multiantenna receiving processor 472 or the controller/processor 475 is used for the action of measurement performed at the base station side in the disclosure.

Although the initial purpose of the FIG. 4 is to describe the NR node and the UE node, the FIG. 4 is also applicable for describing two terminals in D2D communication, only if the above UE 450 and the gNB 410 are viewed as two UEs and the base station-specific functions (for example, radio resource allocation and communication with a core network, etc.) in the gNB 410 are deleted.

Embodiment 5

Figure 5:
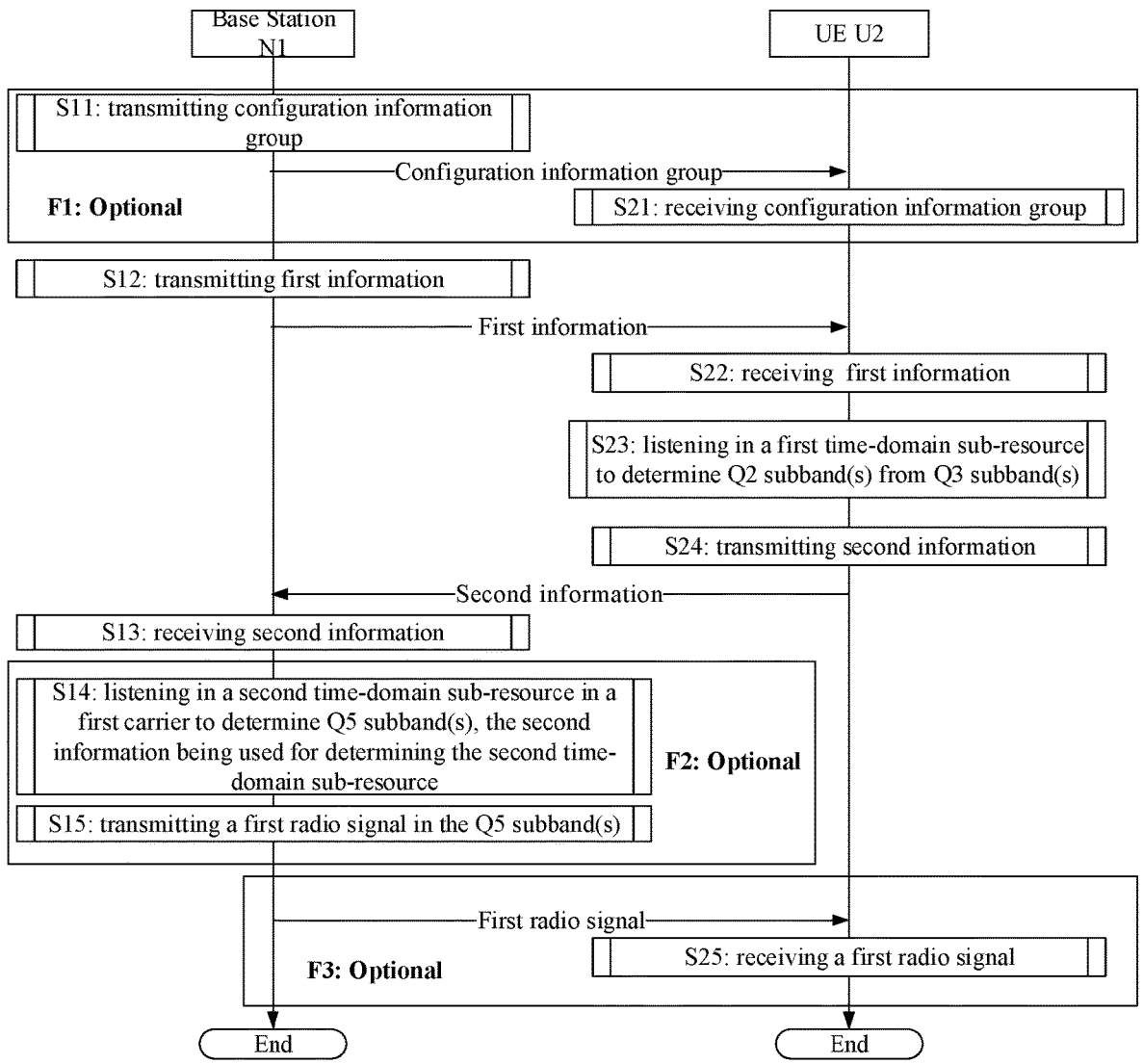
FIG. 5 is a flowchart of downlink transmission according to one embodiment of the disclosure.

Embodiment 5 illustrates a flowchart of wireless transmission, as shown in FIG. 5. Steps included in boxes F1, F2 and F3 are optional. In FIG. 5, a base station N1 is a maintenance base station for a serving cell of a UE U2.

The N1 transmits a configuration information group in S11, transmits first information in S12, receives second information in S13, listens in a second time-domain sub-resource in a first carrier to determine Q5 subband(s) in S14, the second information being used for determining the second time-domain sub-resource, and transmits a first radio signal in the Q5 subband(s) in S15.

The U2 receives the configuration information group in S21, receives the first information in S22, listens in a first time-domain sub-resource to determine Q2 subband(s) from Q3 subband(s) in S23, transmits the second information in S24, and receives the first radio signal in S25.

In Embodiment 5, the configuration information group includes first information, the first information is used for determining that Q1 subband(s) is(are) reserved in a first time-domain resource; the second information is used for indicating the Q2 subband(s), and any one of the Q3 subband(s) is orthogonal to any one of the Q1 subband(s) in frequency domain; a first carrier includes both the Q1 subband(s) and the Q3 subband(s); the Q1, the Q2 and the Q3 are positive integers respectively; the first time-domain sub-resource belongs to the first time-domain resource; and the Q3 is not less than the Q2.

In one embodiment, the UE U2 does not perform listening in the Q1 subband(s) in the first time-domain sub-resource in S23.

In one embodiment, the first information and the second information are transmitted on a PDCCH and a PUCCH respectively.

In one embodiment, the first information and the second information are transmitted on a PDCCH and a PUSCH respectively.

In one embodiment, the first information and the second information are transmitted on an enhanced PDCCH (ePDCCH) and a PUCCH respectively.

In one embodiment, the first information and the second information are transmitted on a PDCCH and a PSCCH respectively.

In one embodiment, the first information and the second information are transmitted on a PDCCH and a PSBCH respectively.

In one embodiment, the first carrier is deployed on unlicensed spectrum.

In one embodiment, the first information and the second information are both transmitted on licensed spectrum.

In one embodiment, the first information is transmitted in a first carrier, and the first carrier is deployed on unlicensed spectrum; and the second information is transmitted on licensed spectrum.

In one embodiment, the first radio signal is transmitted on a Physical Downlink Shared Channel (PDSCH).

In one embodiment, the first radio signal is transmitted on a PSSCH.

In one embodiment, the first radio signal is an output of a first bit block being processed in sequence through channel coding, scrambling, a modulation mapper, a layer mapper, precoding, a resource element mapper and bandwidth symbol generation.

In one embodiment, the first radio signal is an output of a first bit block being processed through channel coding, scrambling, a modulation mapper, a resource element mapper and bandwidth symbol generation.

In one embodiment, the first bit block includes one Transport Block (TB).

In one embodiment, the first bit block includes one or more Code Block Groups (CBGs).

In one embodiment, the configuration information group includes third information, and the third information is used for indicating Q4 subband(s); wherein the Q3 subband(s) is(are) composed of all subbands among the Q4 subbands that do not belong to the Q1 subband(s), and the Q4 is a positive integer.

In one embodiment, the second information indicates the Q2 subband(s) from the Q4 subband(s).

In one embodiment, the second information is composed of Q4 bit(s), the Q4 bit(s) is(are) one-to-one corresponding to the Q4 subband(s), and only Q2 bit(s) among the Q4 bit(s) is(are) 1; and subband(s) correspond(s) to the Q2 bit(s) constitute(s) the Q2 subband(s).

Compared with indicating the Q2 subband(s) from all subbands included in the first carrier, the above embodiment can reduce air interface resources occupied by the second information and improve efficiency of transmission.

In one embodiment, the Q4 is 1, and the second information is transmitted only when the Q4 subband is orthogonal to any one of the Q1 subband(s) (that is, non-overlapping in frequency domain).

The above embodiment is particularly suitable for terminals with Radio Frequency (RF) capabilities limited.

In one embodiment, the second information indicates the Q2 subband(s) from the Q3 subband(s).

The above embodiment further reduces air interface resources occupied by the second information; however, when the first information is not correctly decoded, the above embodiment may cause misunderstanding.

In one embodiment, the third information is configured semi-statically.

In one embodiment, the third information is a Radio Resource Control (RRC) signaling.

In one embodiment, the third information is UE U2 dedicated.

In one embodiment, the configuration information group includes fourth information, and the fourth information is used for determining a first threshold; wherein the Q2 subband(s) is(are) composed of all subbands among the Q3 subbands on which a detected energy is lower than the first threshold.

In one embodiment, the fourth information is configured semi-statically.

In one embodiment, the fourth information is an RRC signaling.

In one embodiment, the fourth information indicates the first threshold.

In one embodiment, the fourth information indicates one or more parameters required to generate the first threshold.

In one embodiment, the fourth information is cell specific.

In one embodiment, the fourth information is specific to the first carrier.

In one embodiment, the first threshold is in unit of dBm.

In one embodiment, for any one subband among the Q3 subband(s), if the UE U2 detects an energy lower than the first threshold in a first time-domain sub-resource in a corresponding frequency domain resource, the UE U2 counts the any one subband into the Q2 subband(s).

In one embodiment, the detected energy in a first time-domain sub-resource in a corresponding frequency domain resource is based on an Effective Isotropic Radiated Power (EIRP).

In one embodiment, the detected energy in a first time-domain sub-resource in a corresponding frequency domain resource includes a receiving beamforming gain.

In one embodiment, the detected energy in a first time-domain sub-resource in a corresponding frequency domain resource does not include a receiving beamforming gain.

In one embodiment, the first radio signal includes V sub-signals, and the V sub-signals correspond to V terminals respectively; the UE U2 is one of the V terminals, and the UE U2 only receives one corresponding sub-signal in the first radio signal; and the V is a positive integer greater than 1.

In one embodiment, the V sub-signals are Frequency Division Multiplexing (FDM).

In one embodiment, at least two of the V sub-signals are Spatial Division Multiplexing (SDM).

In one embodiment, the first information is a DCI identified by a Cell Common Radio Network Temporary Identifier (CC-RNTI).

In one embodiment, in S14, the base station N1 performs listening operations in all subbands in the first carrier separately, that is, subband based LBT.

In one embodiment, in S14, the action of listening performed by the base station N1 is based on an EIRP.

In one embodiment, in S14, the action of listening performed by the base station N1 includes a receiving beamforming gain.

In one embodiment, in S14, the action of listening performed by the base station N1 does not include a receiving beamforming gain.

In one embodiment, the first radio signal is transmitted in the first time-domain resource.

The essence of the above embodiment is that the base station N1 terminates in advance the transmission in the Q1 subband(s) according to the second information, and performs LBT in the first carrier again to select more subbands for downlink transmission, thus improving system capacity.

In one embodiment, the Q5 subband(s) is(are) a subset of the Q2 subband(s), and the Q5 is a positive integer not greater than the Q2.

In one embodiment, a duration of the second time-domain sub-resource is less than a duration of one multicarrier symbol.

In one embodiment, a duration of the second time-domain sub-resource is not greater than 25 microseconds.

In one embodiment, the second information is used by a receiver of the second information to determine a second time-domain sub-resource to perform listening in the first carrier, and the receiver of the second information is a transmitter of the first information.

In one embodiment, the second information is used for determining the second time-domain sub-resource.

In one embodiment, the second information is used for determining termination of transmission in the Q1 subband(s).

In one embodiment, the second time-domain sub-resource is within the first time-domainresource.

In one embodiment, the first radio signal is transmitted in the first time-domain resource.

In one embodiment, the Q5 subband(s) include(s) one or more subsets of the Q2 subband(s), and the Q5 is a positive integer not greater than the Q2.

Embodiment 6

Figure 6:
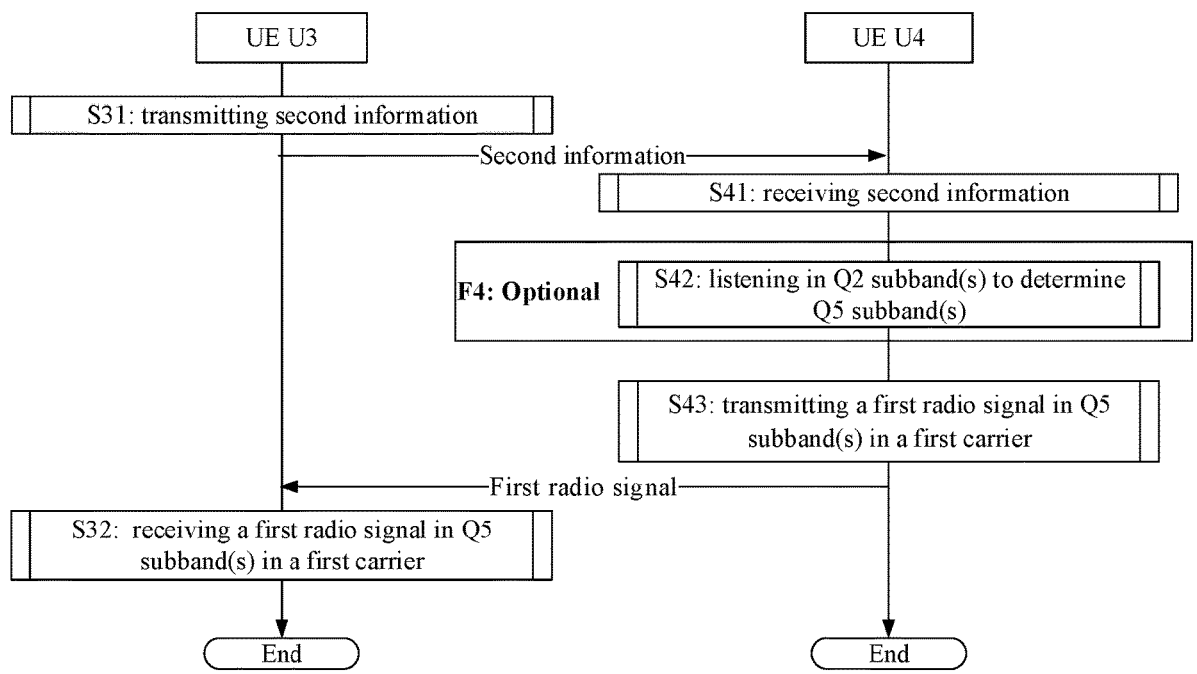
FIG. 6 is a flowchart of D2D transmission according to one embodiment of the disclosure.

Embodiment 6 illustrates a flowchart of D2D transmission, as shown in FIG. 6. Steps included in box F4 are optional.

In Embodiment 6, a UE U3 and a UE U4 are two UEs performing D2D communication.

The U3 transmits second information in S31, the second information being used for indicating Q2 subband(s) and the Q2 subband(s) all belonging to a first carrier, and receives a first radio signal in Q5 subband(s) in the first carrier S32.

The U4 receives the second information in S41, listens in the Q2 subband(s) to determine the Q5 subband(s) in S42, on each of the Q5 subband(s) a detected energy being not greater than a second threshold, and transmits a first radio signal in the Q5 subband(s) in the first carrier in S43.

In Embodiment 6, the second information is used for determining the Q5 subband(s); a transmitter of the second information is one terminal, the Q2 and the Q5 are positive integers respectively.

In Embodiment 6, the second information helps the UE U4 select an propriate subband to transmit a first radio signal, so as to avoid interfering with downlink signals.

In one embodiment, the Q5 subband(s) is(are) a subset of the Q2 subband(s), and the Q5 is a positive integer not greater than the Q2.

In on embodiment, the second information is used for indicating an end time of the first time-domain resource.

In on embodiment, the second information is used for indicating a start time and a duration of the first time-domain resource.

In one embodiment, the second threshold is configurable.

In one embodiment, the second threshold is fixed.

In one embodiment, all subbands among the Q2 subbands on which a detected energy is not greater than a second threshold constitute the Q5 subbands.

In one embodiment, a unit of the second threshold is the same as a unit of the first threshold in the disclosure.

In one embodiment, the second threshold is different from the first threshold in the disclosure.

In one embodiment, in S42, the action of listening performed by the UE U4 in each of the Q2 subband(s) is Category 4 LBT.

In one embodiment, in S42, the action of listening performed by the UE U4 in each of the Q2 subband(s) is Category 2 LBT.

In one embodiment, in S42, the action of listening performed by the UE U4 in each of the Q2 subband(s) is based on an ERP.

In one embodiment, in S42, the action of listening performed by the UE U4 in each of the Q2 subband(s) includes a beamforming gain.

In one embodiment, the second information is used for determining an end time of a first time-domain resource; Q1 subband(s) in the first time-domain resource is(are) indicated, by first information, to be reserved, and the first information is used by the UE U3 to determine the Q2 subband(s) from Q3 subband(s); any one of the Q3 subband(s) is orthogonal to any one of the Q1 subband(s) in frequency domain; the first carrier includes both the Q1 subband(s) and the Q3 subband(s); the Q1 and the Q3 are positive integers respectively; and the Q3 is not less than the Q2.

Embodiment 7

Figure 7:
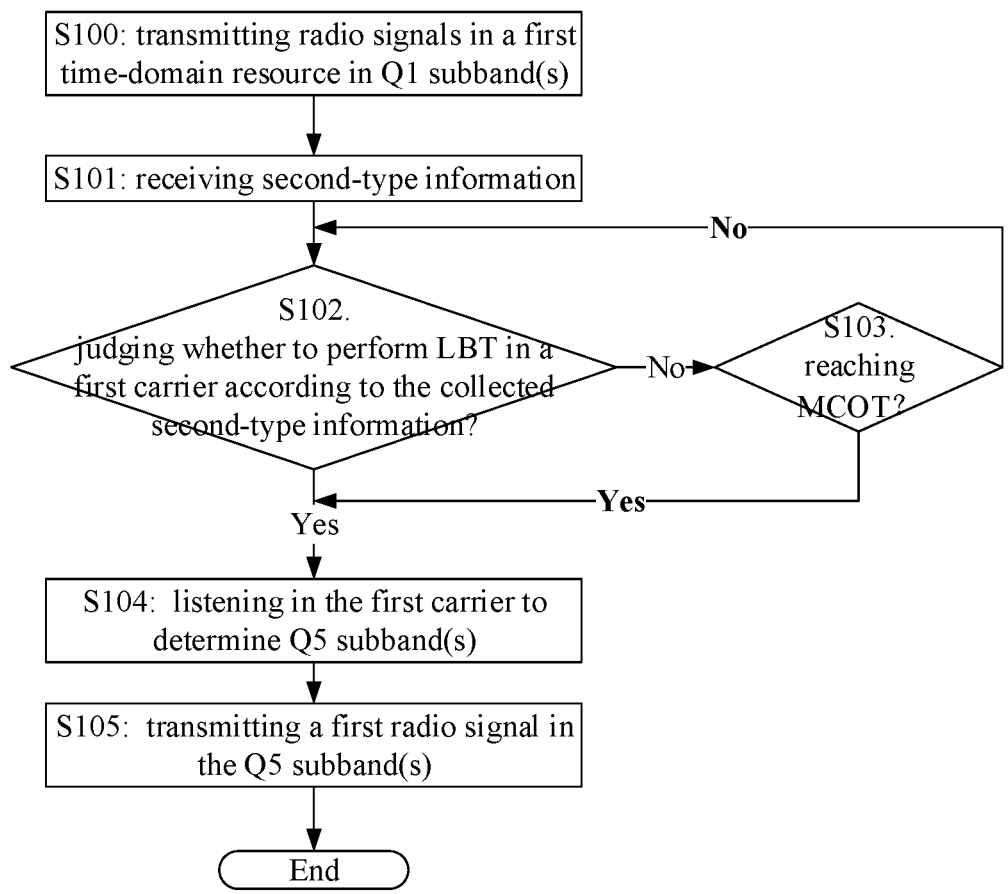
FIG. 7 is a flowchart of performing LBT by means of second-type information according to one embodiment of the disclosure.

Embodiment 7 illustrates a flowchart of performing LBT by means of second-type information, as shown in FIG. 7. Steps in FIG. 7 are performed in a base station.

The base station transmits radio signals in a first time-domain resource in Q1 subband(s) in S100; the base station receives second-type information transmitted by one or more UEs in S101, wherein the second-type information transmitted by one UE is the second information in the disclosure; the base station judges whether to perform LBT in a first carrier according to the received second-type information in S102; if not, the base station judges whether the current transmitting duration in the Q1 subband(s) reaches an MCOT in S103; if not, the base station continues judging whether to perform LBT in the first carrier according to the received second-type information in S102; if the base station determines to perform LBT in the first carrier in S102 or determines that the current transmitting duration in the Q1 subband(s) reaches an MCOT in S103, the base station listens in the first carrier to determine Q5 subband(s) in S104; and the base station transmits a first radio signal in the Q5 subband(s) in S105.

In Embodiment 7, if the base station determines to perform LBT in the first carrier in S102 and the current transmitting duration in the Q1 subband(s) does not reach an MCOT, the base station immediately terminates the transmission in the Q1 subband(s) without waiting the transmitting time to reach the MCOT, and performs listening in a second time-frequency sub-resource to determine the Q5 subband(s), wherein the second time-frequency sub-resource belongs to a current MCOT (that is to say, a time interval to a current transmitting start time of the base station in the Q1 subband(s) is less than an MCOT) in time domain, and time-domain resources occupied by the first radio signal also belong to the current MCOT.

In one embodiment, the base station transmits radio signals in partial multicarrier symbols in a first time-domain resource in Q1 subband(s), the second time-domain sub-resource belongs to the first time-domain resource in time domain, and time-domain resources occupied by the first radio signal also belong to the first time-domain resource.

In one embodiment, the base station performs LBT in each subband in the first carrier in S104, and all subbands considered idle constitute the Q5 subbands.

In one embodiment, in S102, the base station collects second-type information reported by multiple UEs, if the second-type information of more than a certain percentage indicates that a number of idle subbands in the first carrier is greater than a second percentage, the base station determines to perform LBT in the first carrier, otherwise, the base station determines not to perform LBT in the first carrier.

In one embodiment, the first percentage is 100%, the second percentage is greater than a quotient of the Q1 divided by Q, and the Q is a number of subbands included in the first carrier.

In one embodiment, in S102, the base station collects second-type information reported by one UE only, that is, the second information; if Q2 (idle) subbands indicated by the second information include all subbands in the first carrier other than the Q1 subband(s), the base station determines to perform LBT in the first carrier, otherwise, the base station determines not to perform LBT in the first carrier.

In one embodiment, a duration of the second time-domain sub-resource is less tan a duration of one multicarrier symbol.

In one embodiment, a duration of the second time-domain sub-resource is not greater than 25 seconds.

Embodiment 8

Figure 8:
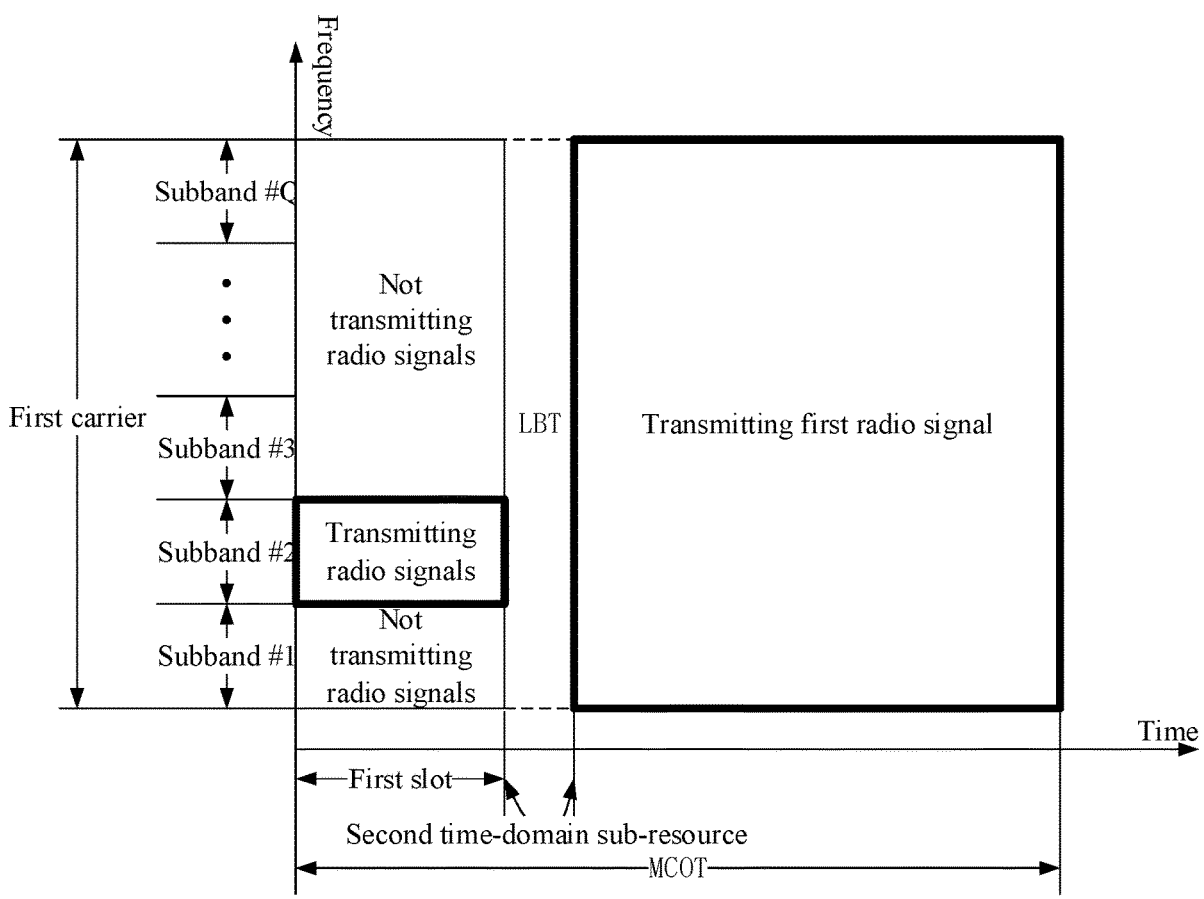
FIG. 8 is a diagram illustrating a transmission of a first radio signal according to one embodiment of the disclosure.

Embodiment 8 illustrates a diagram of transmission of a first radio signal, as shown in FIG. 8.

In Embodiment 8, a first carrier is composed of Q subbands, that is, subbands #1, #2, #3, . . . , #Q; a base station transmits radio signals only in the subband #2 among the Q subbands in a first slot, as shown by a left bold-line box in FIG. 8; in a second time-domain sub-resource, the base station performs LBT and determines that all subbands in the first carrier are idle, and then transmits a first radio signal in all subbands in the first carrier, as shown by a right bold-line box shown in FIG. 8.

In Embodiment 8, the second information received by the base station before the second time-domain sub-resource is used for triggering an LBT operation.

In Embodiment 8, the base station occupies the subband #2 starting from the start time of the first slot, time intervals from the second time-domain sub-resource and the first radio signal to the start time of the first slot are both less than an MCOT in time domain (that is, the second time-domain sub-resource and the first radio signal are both transmitted in a current MCOT).

In Embodiment 8, the base station terminates the transmission in the subband #2 in time, and transmits a radio signal in the entire first carrier; compared with the scheme in which the base station performs transmission only occupying the subband #2 in a current MCOT, Embodiment 8 improves efficiency of transmission.

In one embodiment, the MCOT is not less than 4 milliseconds.

In one embodiment, the MCOT is not less than 8 milliseconds.

In one embodiment, the MCOT is related to a subcarrier spacing of the current first carrier.

In one embodiment, the first slot is the first time-domain resource in the disclosure.

In one embodiment, the current MCOT is the first time-domain resource in the disclosure.

Embodiment 9

Figure 9:
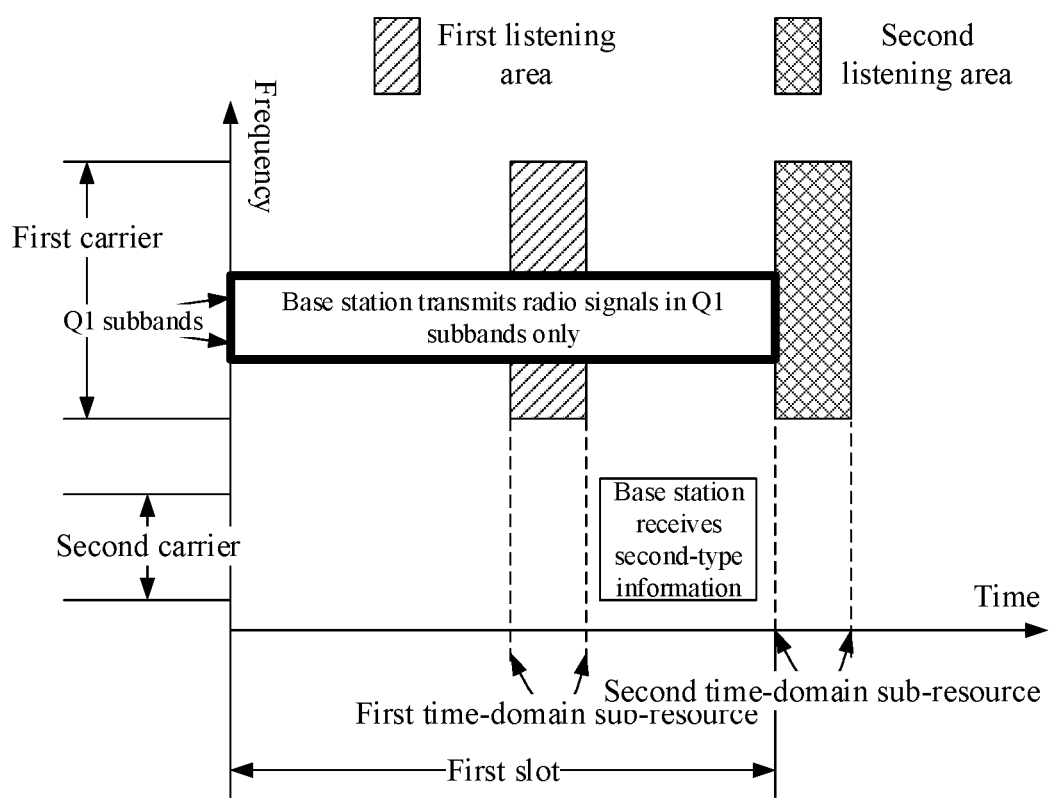
FIG. 9 is a diagram of a base station performing LBT according to one embodiment of the disclosure.

Embodiment 9 illustrates a diagram of a base station performing LBT, as shown in FIG. 9. In FIG. 9, a box filled with slashes and a box filled with cross lines represent a first listening area and a second listening area respectively.

In Embodiment 9, an area identified by a bold-line box represent time-frequency resources occupied by a base station to transmit radio signals, a UE performs listening in frequency domain resources in a first carrier (that is, the first listening area) that are unoccupied by the base station in a first time-domain sub-resource, and then transmits second information in a second carrier to indicate Q2 idle subbands.

The base station receives second-type information in the second carrier before the second time-domain sub-resource, and one piece of second-type information is the second information; and then the base station performs LBT in the first carrier (that is, the second listening area) in a second time-domain sub-resource.

In one embodiment, the first carrier and the second carrier are deployed on unlicensed spectrum and licensed spectrum respectively.

In the above embodiment, the second information is transmitted without performing LBT, thus low latency is guaranteed, the base station can perform LBT as early as possible and can improve efficiency of transmission.

Embodiment 10

Figure 10:
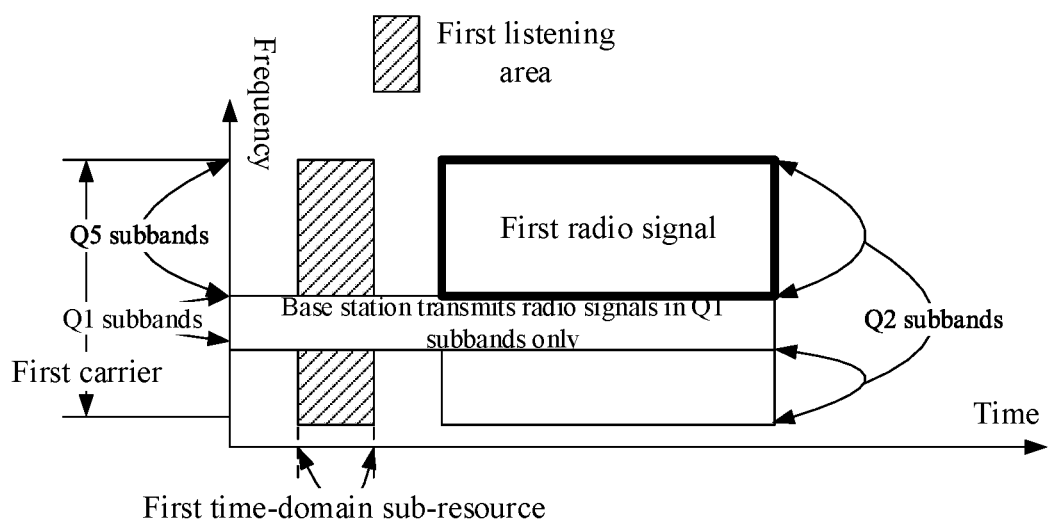
FIG. 10 is a diagram illustrating a transmission of a first radio signal according to another embodiment of the disclosure.

Embodiment 10 illustrates a diagram of transmission of a first radio signal, as shown in FIG. 10. In FIG. 10, a box filled with slashes represents a first listening area, and a bold-line box represents time-frequency resources occupied by a first radio signal. FIG. 10 is applicable to D2D communication.

In Embodiment 10, a first UE and a second UE are two UEs performing D2D communication.

In FIG. 10, a serving cell maintained by a base station transmits radio signals in only Q1 subbands in a first carrier; the first UE performs listening in a first listening area in the first carrier other than the Q1 subbands to determine Q2 subbands, and the first listening area occupies a first time-domain sub-resource in time domain; and the first UE transmits second information to indicate the Q2 subbands.

The second UE receives the second information and determines the Q2 subbands; the second UE selects Q5 subbands from the Q2 subbands to transmit a first radio signal; and the first UE receives the first radio signal in the Q5 subbands.

In one embodiment, the second information is transmitted on a PSBCH, and the first radio signal is transmitted on a PSCCH and a PSSCH.

Embodiment 11

Figure 11:
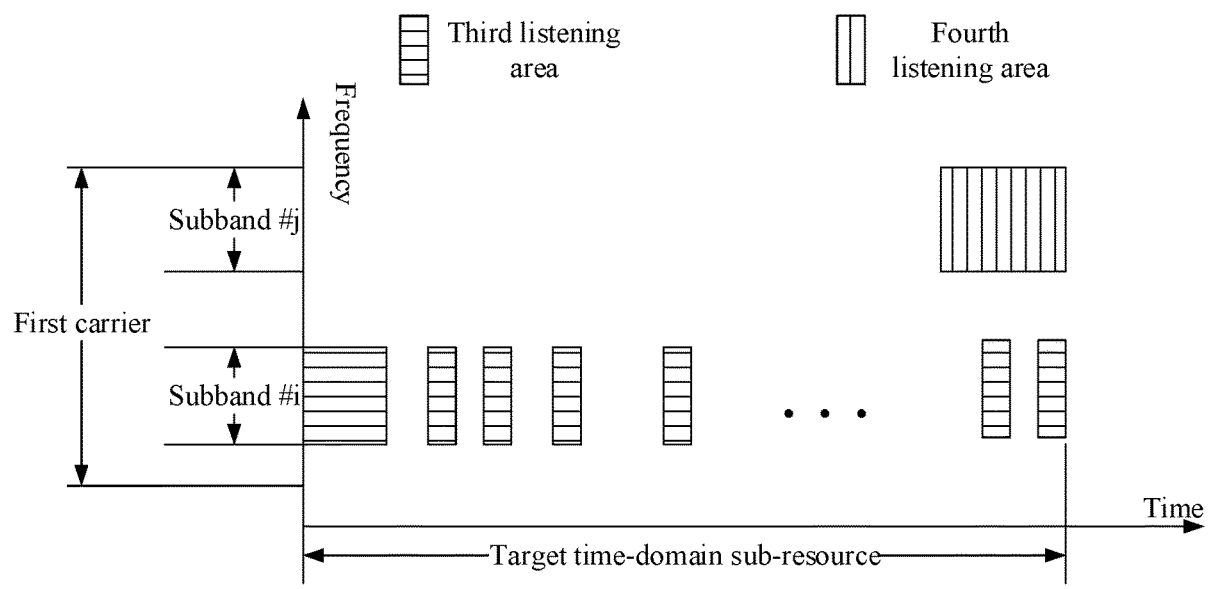
FIG. 11 is a diagram of performing listening in a subband #i and a subband #j according to one embodiment of the disclosure.

Embodiment 11 illustrates a diagram of performing listening in a subband #i and a subband #j, as shown in FIG. 11. In FIG. 11, a box filled with horizontal lines represents a third listening area, and a box filled with vertical lines represents a fourth listening area.

In Embodiment 11, a subband #i and a subband #j are two subbands in a first carrier; in a target time-domain sub-resource, a receiver performs the action of listening only in the third listening area in the subband #i and performs the action of listening only in the fourth listening area in the subband #j; time domain resources occupied by the third listening area are discrete, and time domain resources occupied by the fourth listening area are continuous.

In one embodiment, the target time-domain sub-resource is the first time-domain sub-resource in the disclosure, and the receiver is a UE side device.

In one embodiment, the target time-domain sub-resource is the second time-domain sub-resource in the disclosure, and the receiver is a base station side device.

In one embodiment, the action of listening performed in the third listening area is Category 2 LBT.

In one embodiment, the action of listening performed in the third listening area is Category 4 LBT.

In one embodiment, the subband #i and the subband #j are two subbands among the Q3 subbands in the disclosure; the Q3 is greater than 1; the Q3 subbands are listened in Q3 slots respectively so as to determine the Q2 subband(s); the Q3 slots all belong to the first time-domain sub-resource; and at least two of the Q3 slots are not completely overlapping; time domain resources occupied by the third listening area and time domain resources occupied by the fourth listening area correspond to two of the Q3 slots respectively.

In one embodiment, the UE performs listening in Q3 slots respectively so as to determine the Q2 subbands.

In one embodiment, the Q3 slots are configurable.

In one embodiment, one slot can be considered completely overlapping with another slot, only when a start time, a duration and an end time of the one slot are the same as the another slot.

In one embodiment, durations of the Q3 slots are configurable.

In one embodiment, if any one of the Q3 subbands is spatially related to at least one of the Q1 subbands in the disclosure, a slot among the Q3 slots that is corresponding to the any one subband has a duration equal to a first time length; otherwise, a slot among the Q3 slots that is corresponding to the any one subband has a duration equal to a second time length.

In one embodiment, whether the any one subband is spatially related to at least one of the Q1 subbands is configurable.

In one embodiment, the spatially related means Quasi Co-Located (QCLed).

In one embodiment, if receiving parameters of the UE in one subband are spatially related to receiving parameters in another subband, the former subband is considered spatially related to the another subband.

Embodiment 12

Figure 12:
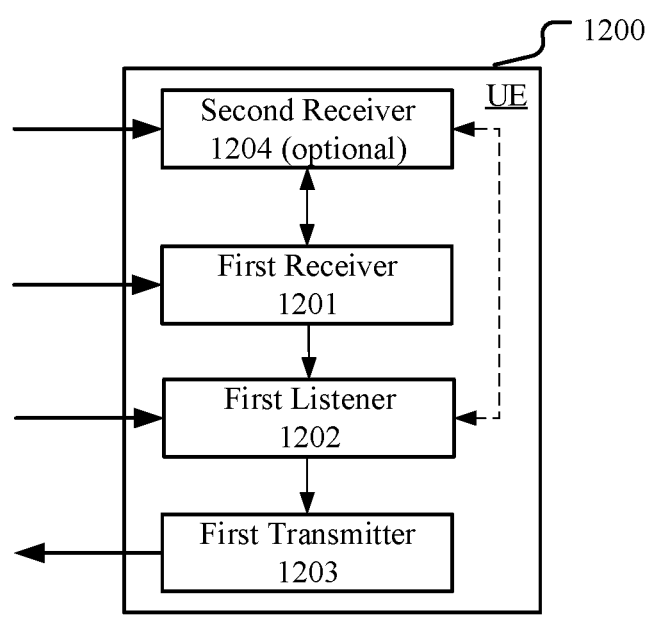
FIG. 12 is a structure block diagram of a processing device in a UE according to one embodiment of the disclosure.

Embodiment 12 illustrates a structure block diagram of a processing device in a UE, as shown in FIG. 12. In Embodiment 12, the UE 1200 includes a second receiver 1204, a first receiver 1201, a first listener 1202 and a first transmitter 1203, wherein the second receiver 1204 is optional.

In Embodiment 12, the first receiver 1201 receives first information, the first information being used for determining that Q1 subband(s) is(are) reserved in a first time-domain resource; the first listener 1202 listens in a first time-domain sub-resource to determine Q2 subband(s) from Q3 subband(s); the first transmitter 1203 transmits second information, the second information being used for indicating the Q2 subband(s), and any one of the Q3 subband(s) being orthogonal to any one of the Q1 subband(s) in frequency domain.

In Embodiment 12, a first carrier includes both the Q1 subband(s) and the Q3 subband(s); the Q1, the Q2 and the Q3 are positive integers respectively; the first time-domain sub-resource belongs to the first time-domain resource; and the Q3 is not less than the Q2.

In one embodiment, the second receiver 1204 receives third information, the third information being used for indicating Q4 subband(s); wherein the Q3 subband(s) is(are) composed of all subbands among the Q4 subbands that do not belong to the Q1 subband(s), and the Q4 is a positive integer.

In one embodiment, the second receiver 1204 receives fourth information, the fourth information being used for determining a first threshold; wherein the Q2 subband(s) is(are) composed of all subbands among the Q3 subbands on which a detected energy is lower than the first threshold.

In one embodiment, the second receiver 1204 receives a first radio signal in Q5 subband(s) in the first carrier; wherein the second information is used by a transmitter of the first radio signal to determine the Q5 subband(s); the transmitter of the first radio signal is one terminal, or the transmitter of the first radio signal is a transmitter of the first information; and the Q5 is a positive integer.

The second receiver 1204, the first receiver 1201, the first listener 1202 and the first transmitter 1203.

In one embodiment, the first receiver 1201 includes the antenna 452, the receiver 454 and the receiving processor 456 illustrated in FIG. 4.

In one embodiment, the first receiver 1201 includes at least one of the multiantenna receiving processor 458 and the controller/processor 459 illustrated in FIG. 4.

In one embodiment, the first listener 1202 includes the antenna 452, the receiver 454 and the receiving processor 456 illustrated in FIG. 4.

In one embodiment, the first transmitter 1203 includes the antenna 452, the transmitter 454 and the transmitting processor 468 illustrated in FIG. 4.

In one embodiment, the first transmitter 1203 includes at least one of the multiantenna transmitting processor 457 and the controller/processor 459 illustrated in FIG. 4.

In one embodiment, the second receiver 1204 includes the antenna 452, the receiver 454, the receiving processor 456, the multiantenna receiving processor 458 and the controller/processor 459 illustrated in FIG. 4.

Embodiment 13

Figure 13:
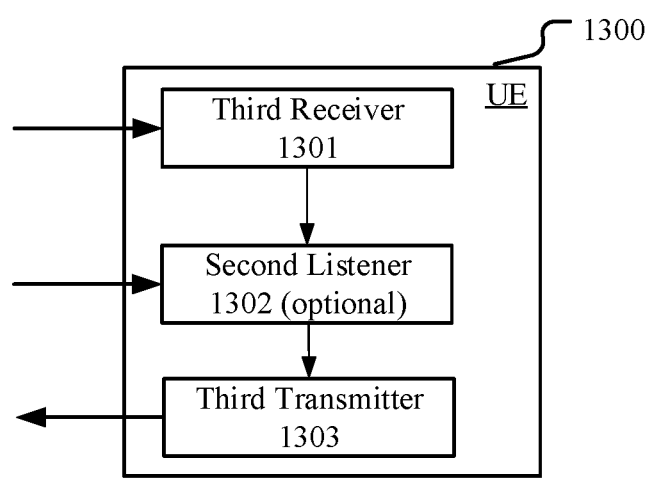
FIG. 13 is a structure block diagram of a processing device in a UE according to another embodiment of the disclosure.

Embodiment 13 illustrates a structure block diagram of a processing device in a UE, as shown in FIG. 13. In Embodiment 13, the UE includes a third receiver 1301, a second listener 1302 and a third transmitter 1303, wherein the third transmitter 1203 is optional.

In Embodiment 13, the third receiver 1301 receives second information, the second information being used for indicating Q2 subband(s), and the Q2 subband(s) all belonging to a first carrier; the second listener 1302 listens in the Q2 subband(s) to determine the Q5 subband(s); the third transmitter 1203 transmits a first radio signal in Q5 subband(s) in the first carrier.

In Embodiment 13, the second information is used for determining the Q5 subband(s); a transmitter of the second information is one terminal; the Q2 and the Q5 are positive integers respectively; and on each of the Q5 subband(s) a detected energy is not greater than a second threshold.

In one embodiment, the third receiver 1301 includes the antenna 452, the receiver 454 and the receiving processor 456 illustrated in FIG. 4.

In one embodiment, the third receiver 1301 includes at least one of the multiantenna receiving processor 458 and the controller/processor 459 illustrated in FIG. 4.

In one embodiment, the second listener 1302 includes the antenna 452, the receiver 454 and the receiving processor 456 illustrated in FIG. 4.

In one embodiment, the third transmitter 1303 includes the antenna 452, the transmitter 454 and the transmitting processor 468 illustrated in FIG. 4.

In one embodiment, the third transmitter 1303 includes at least one of the multiantenna transmitting processor 457 and the controller/processor 459 illustrated in FIG. 4.

Embodiment 14

Figure 14:
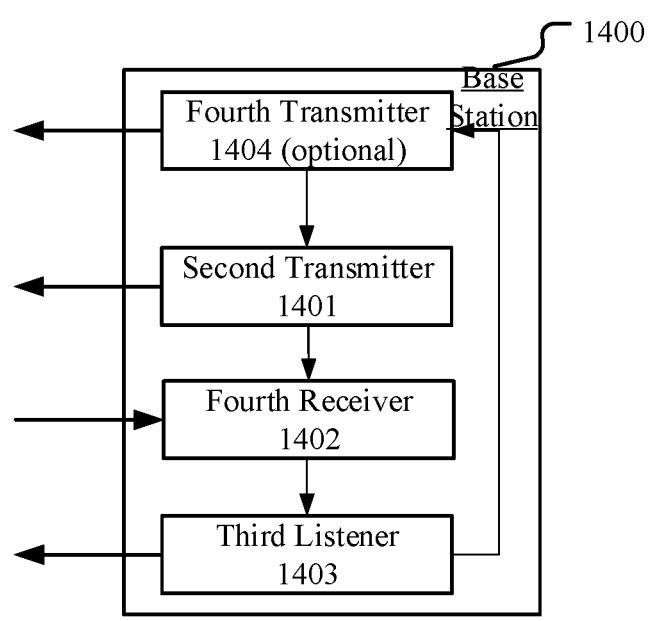
FIG. 14 is a structure block diagram of a processing device in a base station according to one embodiment of the disclosure.

Embodiment 14 illustrates a structure block diagram of a processing device in a base station, as shown in FIG. 14. In Embodiment 14, a base station 1400 includes a fourth transmitter 1404, a second transmitter 1401, a fourth receiver 1402 and a third listener 1403, wherein the fourth transmitter 1404 is optional.

In Embodiment 14, the second transmitter 1401 transmits first information, the first information being used for determining that Q1 subband(s) is(are) reserved in a first time-domain resource; the fourth receiver 1402 receives second information, the second information being used for indicating Q2 subband(s); the third listener 1403 listens in a second time-domain sub-resource in the first carrier to determine Q5 subband(s); and the fourth transmitter 1404 transmits a first radio signal in the Q5 subband(s).

In Embodiment 14, the first information is used for determining the Q2 subband(s) from Q3 subband(s), any one of the Q3 subband(s) is orthogonal to any one of the Q1 subband(s) in frequency domain; the first carrier includes both the Q1 subband(s) and the Q3 subband(s); the Q1, the Q2 and the Q3 are positive integers respectively; a first time-domain sub-resource belongs to the first time-domain resource; the Q3 is not less than the Q2; and the second information is used for determining the second time-domain sub-resource.

In one embodiment, the second transmitter 1401 includes the antenna 420, the transmitter 418 and the transmitting processor 416 illustrated in FIG. 4.

In one embodiment, the second transmitter 1401 includes the multiantenna transmitting processor 471 and the controller/processor 475 illustrated in FIG. 4.

In one embodiment, the fourth receiver 1402 includes the antenna 420, the receiver 418 and the receiving processor 470 illustrated in FIG. 4.

In one embodiment, the fourth receiver 1402 includes the multiantenna receiving processor 472 and the controller/processor 475 illustrated in FIG. 4.

In one embodiment, the third listener 1403 includes the antenna 420, the receiver 418 and the receiving processor 470 illustrated in FIG. 4.

In one embodiment, the third listener 1403 includes the multiantenna receiving processor 472 and the controller/processor 475 illustrated in FIG. 4.

In one embodiment, the fourth transmitter 1404 includes the antenna 420, the transmitter 418, the transmitting processor 416 and the controller/processor 475 illustrated in FIG. 4.

In one embodiment, the fourth transmitter 1404 includes the multiantenna transmitting processor 471 illustrated in FIG. 4.

In one embodiment, a duration of the second time-domain sub-resource is less than a duration of one multicarrier symbol.

In one embodiment, a duration of the second time-domain sub-resource is not greater than 25 microseconds.

In one embodiment, the second information is used by a receiver of the second information to determine a second time-domain sub-resource to perform listening in the first carrier; and the receiver of the second information is a transmitter of the first information.

Embodiment 15

Figure 15:
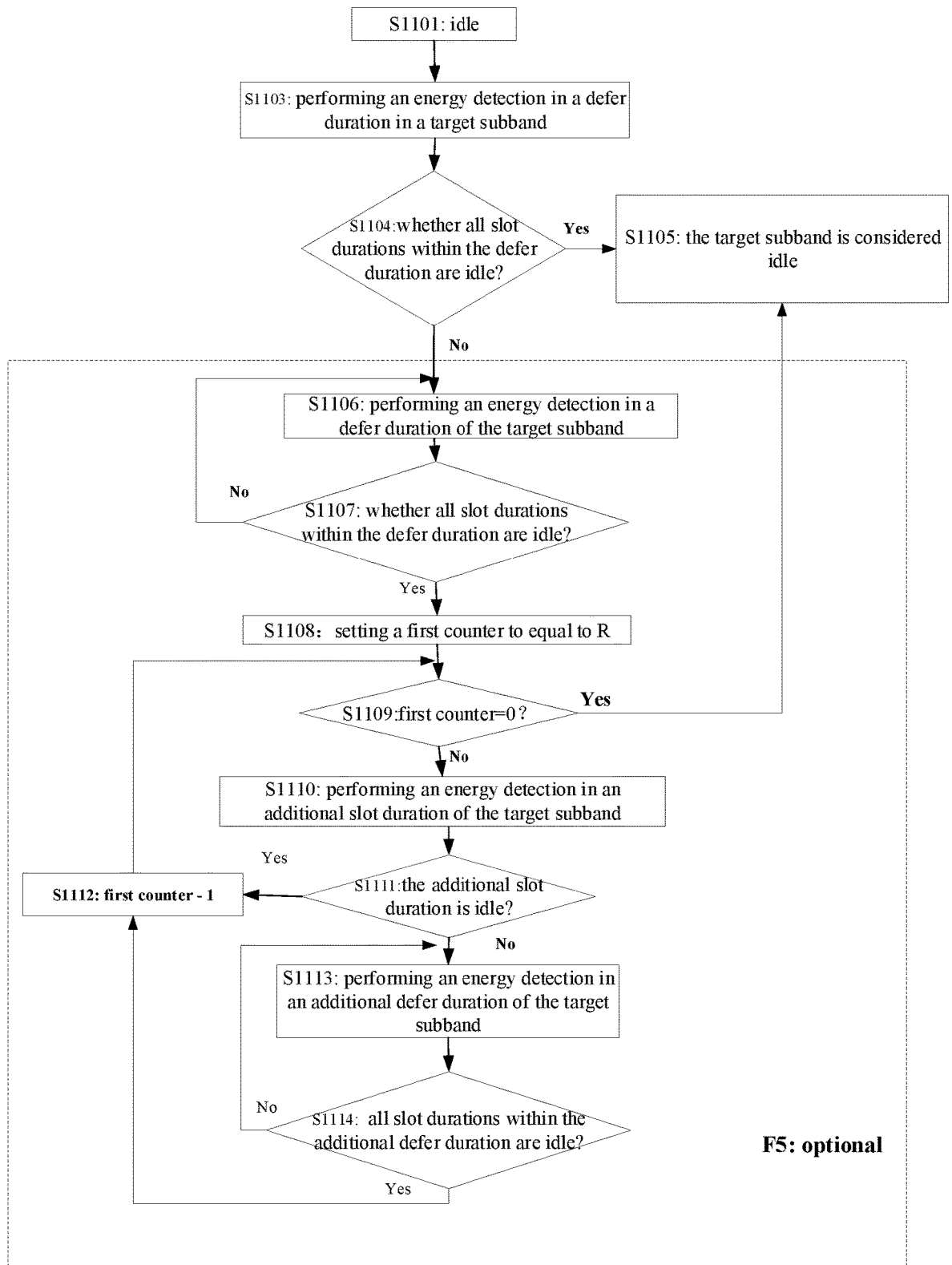
FIG. 15 is a flowchart of determining whether a target subband is idle according to one embodiment of the disclosure.

Embodiment 15 illustrates a flowchart of determining whether a target subband is idle, as shown in FIG. 15. Steps in box F5 are optional.

In Embodiment 15, a receiver performs R measurements in R time subpools respectively. The energy detection in the disclosure includes the R measurements.

The receiver performs R measurements in R time subpools respectively and obtains R measured power values. R1 measured power values among the R measured power values are lower than a specific threshold. R1 time subpools are time subpools among the R time subpools that are corresponding to the R1 measured power values respectively. The process of the R measurements can be described by the flowchart in FIG. 15.

A receiver is in an idle state in S1101; performs an energy detection in a defer duration of a target subband in S1103; determines whether all slot durations within the defer duration are idle in S1104, if yes, goes to S1105 to transmit a radio signal, otherwise, goes to S1106 to perform an energy detection in a defer duration of the target subband; determines whether all slot durations within the defer duration are idle in S1107, if yes, goes to S1108 to set a first counter to equal to R1, otherwise, returns to S1106; determines whether the first counter is 0 in S1109, if yes, goes to S1105 to transmit a radio signal, otherwise, goes to S1110 to perform an energy detection in an additional slot duration of the target subband; determines whether the additional slot duration is idle in S111, if yes, goes to step S1112 to subtract 1 from the first counter, and then returns to S1109, otherwise, goes to S1113 to perform an energy detection in an additional defer duration of the target subband; determines whether all slot durations within the additional defer duration are idle in S1114, if yes, goes to S1112, otherwise, returns to S1113.

In one embodiment, the R1 is equal to 0, and the receiver determines that all slot durations within the defer duration are idle in S1104.

In one embodiment, the R measured power values and the specific threshold are both in unit of dBm, In one embodiment, the R measured power values and the specific threshold are both in unit of mW.

In one embodiment, the R measured power values and the specific threshold are both in unit of Joule (J).

In one embodiment, the specific threshold is equal to or less than −72 dBm.

In one embodiment, the R time subpools have a same duration.

In one embodiment, any one of the R time subpools has a duration not greater than 25 microseconds.

In one embodiment, any one of the R time subpools has a duration not greater than 34 microseconds.

In one embodiment, any one of the R time subpools has a duration not greater than 9 microseconds.

In one embodiment, any one of the R time subpools has a duration not greater than 16 microseconds.

In one embodiment, the receiver is the first listener 1202 illustrated in FIG. 12, and the specific threshold is the first threshold in the disclosure.

In one embodiment, the receiver is the second listener 1302 illustrated in FIG. 13.

In one embodiment, the receiver is the third listener 1403 illustrated in FIG. 14, and the specific threshold is the second threshold in the disclosure.

In one embodiment, the target subband is one subband in the first carrier in the disclosure.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station or system equipment in the disclosure includes but not limited to macro-cellular base stations, micro-cellular base stations, home base stations, relay base station, gNBs (NR nodes B), Transmitter Receiver Points (TRPs), and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a UE for wireless communication, comprising:
receiving first information, the first information being used for determining that Q1 subband(s) is(are) reserved in a first time-domain resource;
listening in a first time-domain sub-resource to determine Q2 subband(s) from Q3 subband(s); and
transmitting second information, the second information being used for indicating the Q2 subband(s), and any one of the Q3 subband(s) being orthogonal to any one of the Q1 subband(s) in frequency domain;
wherein a first carrier comprises both the Q1 subband(s) and the Q3 subband(s); the Q1, the Q2 and the Q3 are positive integers respectively; the first time-domain sub-resource belongs to the first time-domain resource; and the Q3 is not less than the Q2; the second information is used by a receiver of the second information to determine a second time-domain sub-resource to perform listening in the first carrier; or, the second information is used by a receiver of the second information to determine in the first carrier a possible subband to perform transmission.

2. The method according to claim 1, comprising:
receiving third information, the third information being used for indicating Q4 subband(s);
wherein the Q3 subband(s) is(are) composed of all subbands among the Q4 subbands that do not belong to the Q1 subband(s), and the Q4 is a positive integer.

3. The method according to claim 1, comprising:
receiving fourth information, the fourth information being used for determining a first threshold;
wherein the Q2 subband(s) is(are) composed of all subbands among the Q3 subbands on which a detected energy is lower than the first threshold.

4. The method according to claim 1, comprising:
receiving a first radio signal in Q5 subband(s) in the first carrier;
wherein the second information is used by a transmitter of the first radio signal to determine the Q5 subband(s); the transmitter of the first radio signal is one terminal, or the transmitter of the first radio signal is a transmitter of the first information; and the Q5 is a positive integer.

5. The method according to claim 1, wherein the Q3 is greater than 1; the Q3 subbands are listened in Q3 slots respectively so as to determine the Q2 subband(s); the Q3 slots all belong to the first time-domain sub-resource; and at least two of the Q3 slots are not completely overlapping.

6. A UE for wireless communication, comprising:
a first receiver, to receive first information, the first information being used for determining that Q1 subband(s) is(are) reserved in a first time-domain resource;
a first listener, to listen in a first time-domain sub-resource to determine Q2 subband(s) from Q3 subband(s); and
a first transmitter, to transmit second information, the second information being used for indicating the Q2 subband(s), and any one of the Q3 subband(s) being orthogonal to any one of the Q1 subband(s) in frequency domain;
wherein a first carrier comprises both the Q1 subband(s) and the Q3 subband(s); the Q1, the Q2 and the Q3 are positive integers respectively; the first time-domain sub-resource belongs to the first time-domain resource; and the Q3 is not less than the Q2; the second information is used by a receiver of the second information to determine a second time-domain sub-resource to perform listening in the first carrier; or, the second information is used by a receiver of the second information to determine in the first carrier a possible subband to perform transmission.

7. The UE according to claim 6, comprising:
a second receiver, to receive third information, the third information being used for indicating Q4 subband(s);
wherein the Q3 subband(s) is(are) composed of all subbands among the Q4 subbands that do not belong to the Q1 subband(s), and the Q4 is a positive integer.

8. The UE according to claim 6, comprising:
a second receiver, to receive fourth information, the fourth information being used for determining a first threshold;
wherein the Q2 subband(s) is(are) composed of all subbands among the Q3 subbands on which a detected energy is lower than the first threshold.

9. The UE according to claim 7, comprising:
a second receiver, to receive fourth information, the fourth information being used for determining a first threshold;

wherein the Q2 subband(s) is(are) composed of all subbands among the Q3 subbands on which a detected energy is lower than the first threshold.

10. The UE according to claim 6, comprising:
a second receiver, to receive a first radio signal in Q5 subband(s) in the first carrier;
wherein the second information is used by a transmitter of the first radio signal to determine the Q5 subband(s); the transmitter of the first radio signal is one terminal, or the transmitter of the first radio signal is a transmitter of the first information; and the Q5 is a positive integer.

11. The UE according to claim 7, comprising:
a second receiver, to receive a first radio signal in Q5 subband(s) in the first carrier;
wherein the second information is used by a transmitter of the first radio signal to determine the Q5 subband(s); the transmitter of the first radio signal is one terminal, or the transmitter of the first radio signal is a transmitter of the first information; and the Q5 is a positive integer.

12. The UE according to claim 6, wherein the Q3 is greater than 1; the Q3 subbands are listened in Q3 slots respectively so as to determine the Q2 subband(s); the Q3 slots all belong to the first time-domain sub-resource; and at least two of the Q3 slots are not completely overlapping.

13. The UE according to claim 7, wherein the Q3 is greater than 1; the Q3 subbands are listened in Q3 slots respectively so as to determine the Q2 subband(s); the Q3 slots all belong to the first time-domain sub-resource; and at least two of the Q3 slots are not completely overlapping.

14. A UE for wireless communication, comprising:
a third receiver, to receive second information, the second information being used for indicating Q2 subband(s), and the Q2 subband(s) all belonging to a first carrier; and
a third transmitter, to transmit a first radio signal in Q5 subband(s) in the first carrier;
wherein the second information is used for determining the Q5 subband(s); a transmitter of the second information is one terminal; the Q2 and the Q5 are positive integers respectively; wherein the second information is used for determining an end time of a first time-domain resource; Q1 subband(s) in the first time-domain resource is(are) indicated, by first information, to be reserved, and the first information is used by a transmitter of the second information to determine the Q2 subband(s) from Q3 subband(s); any one of the Q3 subband(s) is orthogonal to any one of the Q1 subband(s) in frequency domain; the first carrier comprises both the Q1 subband(s) and the Q3 subband(s); the Q1 and the Q3 are positive integers respectively; and the Q3 is not less than the Q2.

15. The UE according to claim 14, comprising:
a second listener, to listen in the Q2 subband(s) to determine the Q5 subband(s);
wherein on each of the Q5 subband(s) a detected energy is not greater than a second threshold.

16. A base station for wireless communication, comprising:
a second transmitter, to transmit first information, the first information being used for determining that Q1 subband(s) is(are) reserved in a first time-domain resource; and
a fourth receiver, to receive second information, the second information being used for indicating Q2 subband(s);
a third listener, to listen in a second time-domain sub-resource in the first carrier to determine Q5 subband(s); and
a fourth transmitter, to transmit a first radio signal in the Q5 subband(s);
wherein the first information is used for determining the Q2 subband(s) from Q3 subband(s), any one of the Q3 subband(s) is orthogonal to any one of the Q1 subband(s) in frequency domain; the first carrier comprises both the Q1 subband(s) and the Q3 subband(s); the Q1, the Q2 and the Q3 are positive integers respectively; a first time-domain sub-resource belongs to the first time-domain resource; and the Q3 is not less than the Q2; the second information is used for determining the second time-domain sub-resource.

17. The base station according to claim 16, comprising:
a fourth transmitter, to transmit third information, the third information being used for indicating Q4 subband(s), wherein the Q3 subband(s) is(are) composed of all subbands among the Q4 subbands that do not belong to the Q1 subband(s), and the Q4 is a positive integer.

18. The base station according to claim 16, comprising:
a fourth transmitter, to transmit fourth information, the fourth information being used for determining a first threshold, wherein the Q2 subband(s) is(are) composed of all subbands among the Q3 subbands on which a detected energy is lower than the first threshold.

19. The base station according to claim 16, comprising:
the Q3 is greater than 1; the Q3 subbands are listened in Q3 slots respectively so as to determine the Q2 subband(s); the Q3 slots all belong to the first time-domain sub-resource; and at least two of the Q3 slots are not completely overlapping.

20. The base station according to claim 16, comprising:
the base station collects second-type information reported by multiple UEs, the second information is second-type information reported by one of the multiple UEs; if the second-type information of more than a certain percentage indicates that a number of idle subbands in the first carrier is greater than a second percentage, the base station determines to perform LBT in the first carrier, otherwise, the base station determines not to perform LBT in the first carrier.

* * * * *